US010330005B2

(12) United States Patent
Mudra et al.

(10) Patent No.: US 10,330,005 B2
(45) Date of Patent: Jun. 25, 2019

(54) HYDRAULIC ARRANGEMENT WITH A SWITCH VALVE FOR CONTROLLING A HYDRAULIC FLUID FLOW OF A CONNECTING ROD FOR AN INTERNAL COMBUSTION ENGINE WITH VARIABLE COMPRESSION AND CONNECTING ROD

(71) Applicant: ECO Holding 1 GmbH, Marktheidenfeld (DE)

(72) Inventors: Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/700,094

(22) Filed: Sep. 9, 2017

(65) Prior Publication Data
US 2018/0094576 A1    Apr. 5, 2018

(30) Foreign Application Priority Data

Sep. 30, 2016  (DE) .......... 10 2016 118 643
Jun. 6, 2017   (DE) .......... 10 2017 112 383
Jun. 23, 2017  (DE) .......... 10 2017 113 984

(51) Int. Cl.
| F02B 75/04 | (2006.01) |
| F16C 7/06  | (2006.01) |
| F16K 11/07 | (2006.01) |

(52) U.S. Cl.
CPC .......... *F02B 75/045* (2013.01); *F16C 7/06* (2013.01); *F16K 11/07* (2013.01)

(58) Field of Classification Search
CPC .......... F02B 75/045; F16K 11/07; F16C 7/06
See application file for complete search history.

(56) References Cited

U.S. PATENT DOCUMENTS

| 9,677,469 B2 * | 6/2017  | Wittek | F02B 75/045 |
| 9,828,909 B2 * | 11/2017 | Paul   | F02B 75/045 |
| 9,920,787 B2 * | 3/2018  | Paul   | F02B 75/045 |

(Continued)

FOREIGN PATENT DOCUMENTS

| DE | 102012020999 A1 | 1/2014 |
| DE | 102012112434    | 6/2014 |

(Continued)

*Primary Examiner* — Marquerite J McMahon
(74) *Attorney, Agent, or Firm* — Von Rohrscheidt Patents

(57) ABSTRACT

A hydraulic arrangement including a switch valve configured to control a hydraulic fluid flow of a connecting rod of an internal combustion engine with variable compression including an eccentrical element adjustment device for adjusting an effective connecting rod length, wherein the eccentrical element adjustment device includes at least a first cylinder and a second cylinder forming hydraulic chambers, wherein a first inlet is provided for feeding hydraulic fluid into the first cylinder through a supply conduit, wherein a second inlet is provided for feeding hydraulic fluid into the second cylinder through the supply conduit, wherein a first outlet is provided for draining hydraulic fluid from the first cylinder, wherein a second outlet is provided for draining hydraulic fluid from the second cylinder, wherein the switch valve includes a displaceable piston which is displaceable into a first switching position or a second switching position.

18 Claims, 18 Drawing Sheets

(56) References Cited

U.S. PATENT DOCUMENTS 10,012,143 B2 * 7/2018 Schaffrath ............ F02B 75/045
2015/0152794 A1    6/2015 Paul
2016/0341118 A1 * 11/2016 Kamo ................... F02B 75/045

FOREIGN PATENT DOCUMENTS

| WO | WO2015082722 | 6/2015 |
| WO | WO2016058600 | 4/2016 |
| WO | WO2016083592 | 6/2016 |
| WO | WO2016127985 | 8/2016 |

* cited by examiner

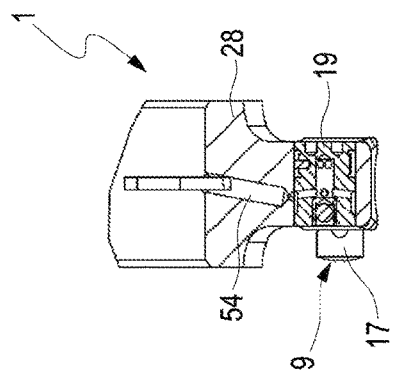
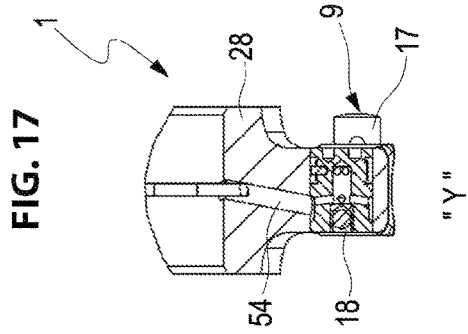
FIG. 17 "X"
FIG. 18 "Y"
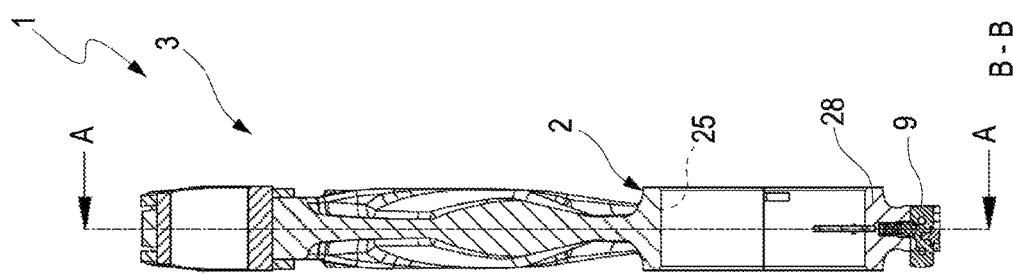
FIG. 16
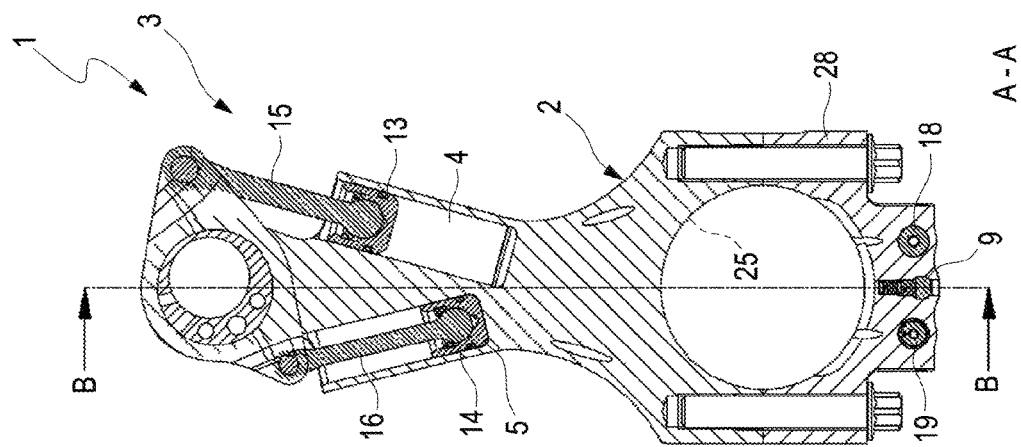
FIG. 15

D - D

"Z"

"W"

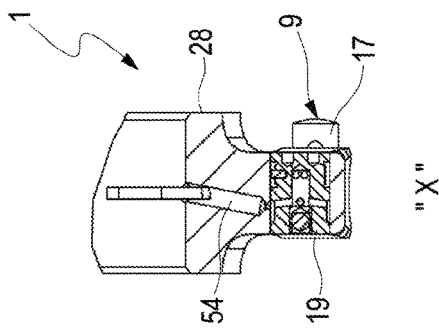
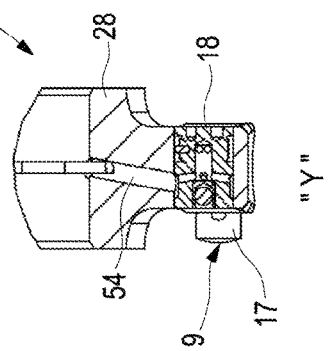
FIG. 31  "X"
FIG. 32  "Y"
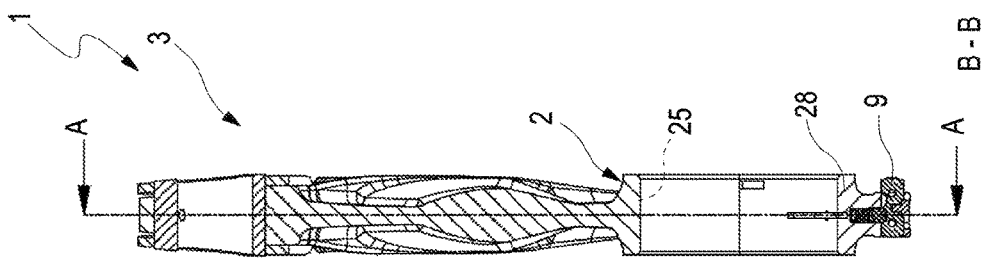
FIG. 30
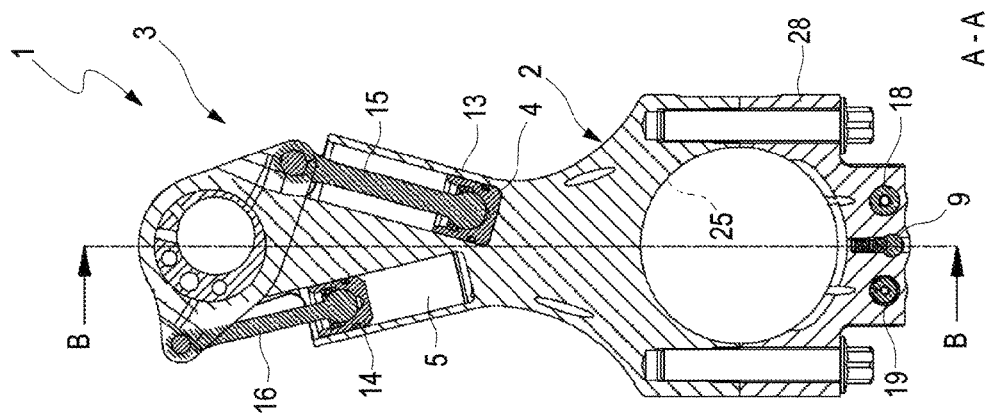
FIG. 29

D-D

"Z"

"W"

HYDRAULIC ARRANGEMENT WITH A SWITCH VALVE FOR CONTROLLING A HYDRAULIC FLUID FLOW OF A CONNECTING ROD FOR AN INTERNAL COMBUSTION ENGINE WITH VARIABLE COMPRESSION AND CONNECTING ROD

RELATED APPLICATIONS

This application claims priority from and incorporates by reference German Patent Applications
DE 10 2016 118 643.0 filed on Sep. 30, 2016,
DE 10 2017 112 383.0 filed on Jun. 6, 2017, and
DE 10 2017 113 984.2 filed on Jun. 23, 2017.

FIELD OF THE INVENTION

The invention relates to a hydraulic arrangement with a switch valve for controlling a hydraulic fluid flow of a connecting rod for an internal combustion engine with an eccentrical element adjustment device for adjusting an effective connecting rod length and a connecting rod with the hydraulic arrangement.

BACKGROUND OF THE INVENTION

In internal combustion engines a high compression ratio has a positive effect upon efficiency of the internal combustion engine. Compression ratio is typically designated as a ratio of an entire cylinder volume before compression to a remaining cylinder volume after the compression. In internal combustion engines with external ignition, in particular gasoline engines which have a fixed compression ratio the compression ratio may only be selected high enough so that a so called "knocking" of the internal combustion engine is prevented under full load operations. However, for the much more prevalent partial load operations of the internal combustion engine, thus at a lower cylinder loading the compression ratio could be selected at higher values without the "knocking" occurring. The important partial load operation of the internal combustion engine can be improved when the compression ratio is variably adjustable. In order to adjust the compression ratio, for example systems with a variable connecting rod length are known.

A hydraulic arrangement for a connecting rod for an internal combustion engine with variable compression with an eccentrical element adjustment device for adjusting an effective connecting rod length is known for example from DE 10 2012 020 999 A1.

BRIEF SUMMARY OF THE INVENTION

Thus, it is an object of the invention to provide an improved hydraulic arrangement for an internal combustion engine with variable compression with an eccentrical element adjustment device for adjusting an effective connecting rod length wherein the hydraulic arrangement has stable operating properties.

It is another object of the invention to provide an improved connecting rod with the hydraulic arrangement.

The object is achieved by a hydraulic arrangement including a switch valve configured to control a hydraulic fluid flow of a connecting rod of an internal combustion engine with variable compression including an eccentrical element adjustment device for adjusting an effective connecting rod length, wherein the eccentrical element adjustment device includes at least a first cylinder and a second cylinder forming hydraulic chambers, wherein a first inlet is provided for feeding hydraulic fluid into the first cylinder through a supply conduit, wherein a second inlet is provided for feeding hydraulic fluid into the second cylinder through the supply conduit, wherein a first outlet is provided for draining hydraulic fluid from the first cylinder, wherein a second outlet is provided for draining hydraulic fluid from the second cylinder, wherein the switch valve includes a displaceable piston which is displaceable into a first switching position or a second switching position, wherein the first outlet of the first cylinder is connected with the supply conduit in the first switching position and the second outlet of the second cylinder is connected with the supply conduit in the second switching position, wherein a first check valve is associated with the first cylinder and a second check valve is associated with the second cylinder, wherein the first check valve facilitates feeding hydraulic fluid into the first cylinder and prevents draining hydraulic fluid from the first cylinder, wherein the first check valve facilitates feeding hydraulic fluid into the second cylinder and prevents draining hydraulic fluid from the second cylinder, wherein the first cylinder and the second cylinder are connected so that hydraulic fluid is transferable from the first cylinder into the second cylinder in the first switching position.

Advantageous embodiments and advantages of the invention can be derived from the additional features, the description and the drawing figures.

According to an aspect of the invention a hydraulic arrangement is proposed which includes a switch valve for controlling a hydraulic fluid flow of a connecting rod for an internal combustion engine with variable compression with an eccentrical element adjustment device for adjusting an effective connecting rod length, wherein the eccentrical element adjustment device includes at least a first cylinder and a second cylinder configured as hydraulic chambers and wherein a respective inlet for feeding hydraulic fluid into the cylinders through a supply connection as well as a respective drain for draining hydraulic fluid from the cylinders is provided. The switch valve includes a movable piston which is optionally displaceable into a first switching position or a second switching position, wherein the drain of the first cylinder is connected with the supply connection in the first switching position and the drain of the second cylinder is connected with the supply connection in the second switching position. Thus, a respective check valve is associated with the cylinders, wherein the check valve facilitates feeding hydraulic fluid into the cylinders and draining hydraulic fluid from the cylinders. Furthermore the cylinders are connected so that hydraulic fluid is conduct able from the first cylinder into the second cylinder in the first switching position.

At a first operating connection of the switch valve according to the invention the first cylinder can be connected as a hydraulic support chamber of an adjustable connecting rod, for example the cylinder on a gas force side (GKS) of the connecting rod and at the second operating connection the second cylinder can be connected as a hydraulic support chamber, for example the cylinder on the mass force side (MKS) of the connecting rod. The respective chambers are typically designated as GKS chamber and MKS chamber.

The speed driven acceleration of the rather long hydraulic fluid columns of the motor oil used as a hydraulic fluid in the connecting rod can generate pressure differences. The pressure differences can have a positive effect as well as a negative effect, this means the hydraulic fluid columns can be accelerated so that emptying or filling the hydraulic chambers of the cylinders of the connecting rod is supported but also impaired. This effect can have a particularly negative impact upon a cylinder on the mass force side (MKS) of the connecting rod. The acceleration of the hydraulic fluid columns can have the effect that no positive pressure differential is formed any more upstream and downstream of the MKS side check valve wherein the positive pressure difference has the effect that hydraulic fluid can be conducted into the MKS chamber. Since the chambers always lose hydraulic fluid through leakage and other effects this causes an incremental slow adjustment of the eccentrical element over plural revolutions and thus of the effective length of the connecting rod from a position with low compression ($\varepsilon_{low}$) which corresponds to the first switching position of the switch valve into a position with high compression ($\varepsilon_{high}$) which corresponds to the second switching position of the check valve. This is designated as drifting. This occurs in particular for engine load cases with high mass forces (tension force and compression force at the connecting rod) and low gas forces (compression force at the connecting rod). A possible adjustment of the connecting rod in a direction ($\varepsilon_{high}$) by the mass forces in tension direction cannot be reset completely by the mass forces in compression direction and by the gas forces.

This effect is advantageously avoided by the hydraulic arrangement according to the invention in that the GKS chamber can conduct the hydraulic fluid that is received in the low compression position ($\varepsilon_{low}$) directly and in an un-throttled manner into the MKS chamber. This is possible because the hydraulic fluid that presses the GKS chamber through the gas a mass forces engaging the connection rod in the compression direction into the MKS chamber has a much higher pressure than the hydraulic fluid pressure of the hydraulic supply in the bearing shell of the connecting rod. Thus, the hydraulic fluid can be pressed from the GKS chamber into the MKS chamber.

In addition to the position stability of the eccentrical element adjustment arrangement of the connecting rod in the position $\varepsilon_{low}$, this means that the connecting rod is in its end position $\varepsilon_{low}$ again after one revolution, also the position stability can increase over the revolution or the stiffness of the connecting rod. During a revolution there is always a movement of the eccentrical element lever since the hydraulic fluid columns also have a certain amount of flexibility so that a certain amount of sinking of the support piston always occurs in the filled chamber. When the connecting rod resets completely up to the end of the revolution this is called "stable position". However, the respective support piston could contact the chamber base upon an angle change at the eccentrical element or the lever assembly during resetting which can also have a negative effect upon service life. Therefore the adjustment speed of the eccentrical element adjustment device can be limited by throttling locations in the hydraulic conduits. A pressure preloaded MKS hydraulic fluid column advantageously sinks less than a non-preloaded hydraulic fluid column. Less sinking means less lever movement which improves position stability in the position $\varepsilon_{low}$.

A hydraulic conduit from the GKS chamber in a direction towards the hydraulic supply with throttling location is advantageous since the GKS chamber and the MKS chamber have different sizes, this means the volume difference of the larger GKS chamber which cannot be absorbed by the MKS side has to be drained towards the hydraulic supply. Due to the forced connection of the two support pistons provided by the lever assembly only the differential volume flow in the position $\varepsilon_{low}$ which is conducted to the hydraulic supply has to be throttled to limit the adjustment velocity of the GKS piston since the MKS chamber cannot absorb all the hydraulic fluid that is provided by the GKS chamber. The throttling location thus has the advantageous effect that a pressure builds up in front of the check valve so that the MKS chamber can be filled reliably. So to speak the MKS chamber is preloaded. Thus, the throttling location is advantageously arranged between a branch off point of the drain and a hydraulic supply where the drain of the first cylinder branches off into the inlet of the second cylinder and the supply conduit.

Advantageously only two check valves are required for this purpose. Other check valves do not have to be provided.

In the position $\varepsilon_{high}$ the MKS side is supplied with the hydraulic fluid in a throttled manner.

The check valve can be provided mechanically actuated or hydraulically actuated and can be arranged at any position in the connecting rod. The volumes of the two cylinders can also be selected identical.

Advantageously the drain of the GKS chamber can be closed by the switch valve in the high compression position $\varepsilon_{high}$ of the connecting rod. Hydraulic fluid can flow through the check valve associated with the GKS chamber. Thus, the check valve is arranged so that a hydraulic fluid drain is only possible in the filling direction. Thus, hydraulic fluid can be provided to the GKS chamber.

The drain of the MKS chamber is opened by the switch valve. The hydraulic fluid flow is run through the throttling location. A hydraulic fluid flow is possible in both flow directions. Through the check valve associated with the MKS chamber a hydraulic fluid flow can only be provided in the filling direction. The hydraulic fluid flow is conducted through the throttling location into the inlet to the MKS chamber. Thus, hydraulic fluid can be drained from the MKS chamber and the MKS chamber can empty.

Advantageously the drain of the MKS chamber can be opened by the switch valve in the low compression position ($\varepsilon_{low}$). The hydraulic fluid flow can flow in a non-throttled manner in a direction of the check valve associated with the MKS chamber. The superfluous hydraulic fluid flow in a direction of the bearing shell of the connecting rod can be conducted through a suitably arranged throttling location. Hydraulic fluid can flow through the check valve associated with the GKS chamber. Thus, the check valve is arranged so that a hydraulic fluid flow is only possible in the filling direction. Thus the GKS chamber can empty.

The drain of the MKS chamber is closed by the check valve. Hydraulic fluid can flow through the check valve associated with the MKS chamber. Thus, the check valve is arranged so that a hydraulic fluid flow is only possible in the filling direction. This way the MKS chamber can be filled.

The hydraulic arrangement according to the invention including a switch valve for controlling a hydraulic fluid flow of a connecting rod for an internal combustion engine with variable compression including an eccentrical element adjustment device for adjusting an effective connecting rod length provides stable switching properties and position stable operating properties of the connecting rod.

In another advantageous embodiment the connection to the hydraulic supply can be omitted in the drain of the GKS chamber so that the entire hydraulic fluid flow is conducted from the GKS chamber directly and in an un-throttled manner in a direction towards the MKS chamber.

Advantageously at least the check valve associated with the MKS chamber can be integrated in the capture device of the switch valve. Throttle locations can also be integrated in the hydraulic conduits in the capture element, for example provided by constrictions in the hydraulic conduits. This way the required installation space of the hydraulic arrangement can be configured as compact as possible.

According to an advantageous embodiment hydraulic fluid can be conductible from the second cylinder into the first cylinder in the second shifting position. Advantageously the hydraulic fluid, for example the motor oil from the MKS chamber can used for filling the GKS chamber so that required hydraulic fluid does not have to be fed in its entirety from the hydraulic supply, for example from the bearing shell of the connecting rod.

According to an advantageous embodiment the drain of the second cylinder can have at least one throttling location. This way the hydraulic fluid flow can be conducted in a throttled manner in a direction towards the GKS chamber in the high compression position ($E_{high}$) which facilitates stable switching properties of the connecting rod.

According to an advantageous embodiment a throttling location can be arranged between the supply conduit and the feed of the second cylinder. Through this throttling location the portion of the hydraulic fluid flow that is branched off in a direction towards the hydraulic supply can be run in the position for low compression ($\epsilon$) so that the greater portion of the hydraulic fluid flow that drains from the GKS chamber can be advantageously used for filling the MKS chamber.

According to an advantageous embodiment a hydraulic connection for filling the second cylinder from the first cylinder can be configured without a throttle. It is also particularly advantageous when the hydraulic connection for filling the second cylinder does not include throttling locations so that filling the MKS chamber from the GKS chamber can be performed in a most effective manner. This facilitates the quickest possible filling of the MKS chamber.

According to an advantageous embodiment the throttling locations and/or at least one of the check valves can be integrated in a discrete hydraulic module. At least the check valve associated with the MKS chamber, the switch valve and/or the throttling locations can be integrated in a separate hydraulic module which can be mounted in a connecting rod as a unit. Thus machining the connecting rod can be simplified considerably.

According to an advantageous embodiment at least one of the throttling locations can be integrated into the switch valve. Advantageously throttling locations in the hydraulic conduits can be integrated in the capture element of the switch valve or also in the valve body, for example by constrictions in the hydraulic conduits. This way the required installation space for the hydraulic arrangement can be configured as compact as possible.

According to an advantageous embodiment at least one of the check valves and/or at least one of the throttling locations can be integrated into the switch valve. Advantageously at least the check valve associated with the MKS chamber can be integrated in the capture element or in the valve body of the check valve. Also throttling locations can be integrated in the hydraulic conduits in the capture element or in the valve body, for example by constrictions in the hydraulic conduits. This way the required installation space of the hydraulic arrangement can be configured as compact as possible.

According to an advantageous embodiment the inlet and the outlet of a cylinder can respectively lead into the cylinder in a common conduit. Inlet and outlet of a cylinder can be run together. Advantageously for example the inlet can branch off from the joint conduit through a check valve. This way the required installation space of the hydraulic arrangement can be optimized and the connecting rod can be configured in an installation space optimized manner.

According to an advantageous embodiment internal combustion engine internal combustion engine internal combustion engine According to an advantageous embodiment the movable piston can be configured as capture element. Advantageously the movable piston can connect operating connections and/or supply connections in the valve body of the switch valve through suitably configured bore holes in the piston and can thus operate as a capture element. The capture element can move into different switching positions of the switch valve through suitable interlocking devices so that the connections of the switch valve can be connected reliably.

According to another aspect of the invention a switch valve for a hydraulic arrangement is proposed, the switch valve including at least one movable piston which is displaceable into a first switching position or a second switching position. Thus, at least a first operating connection is connected with a first supply connection in the first switching position and at least a second operating connection is connected with a second supply connection in the second switching position.

At the first operating connection of the check valve according to the invention a first cylinder can be connected as a hydraulic support chamber of an adjustable connecting rod, for example the cylinder on the gas force side GKS of the connecting rod and at the second operating connection a second cylinder can be connected as a hydraulic support chamber, for example a cylinder on the mass force side MKS of the connecting rod.

According to an advantageous embodiment a hydraulic fluid conduit between an operating connection and a supply connection can include at least one throttling location. Advantageously throttling locations in the hydraulic conduits can be integrated in a capture element of the switch valve or also in the valve body, for example by constrictions in the hydraulic conduits. This way the required installation space of the hydraulic arrangement can be configured as compact as possible.

According to an advantageous embodiment a hydraulic fluid conduit between an operating connection and a supply connection can include at least one check valve and/or at least one throttling location.

Advantageously a check valve can be provided in the switch valve, wherein the check valve facilitates emptying the associated cylinder and feeding hydraulic fluid into the other cylinder. The check valve can be advantageously arranged directly in the capture element of the switch valve.

The capture element can be for example movably arranged in a bore hole of the valve housing and can be optionally displaceable into the first switching position or the second switching position wherein the outlet of the first cylinder is connected with the switch valve in the first switching position and the outlet of the second cylinder is connected with the switch valve in the second switching position. Hydraulic fluid from the drain of the first cylinder can thus be conducted in the first switching position of the switch valve according to the invention from the first operating connection of the switch valve through the check valve to the second operating connection so that it can be used for filling the second cylinder. Thus, it is advantageously prevented that the hydraulic fluid has to be run back first through the supply connection of the check valve which leads into a supply conduit to a tank and can only be provided to the second cylinder through the supply conduit from the tank.

Thus, advantageously hydraulic fluid for example from the GKS chamber of the connecting rod can drain in the first switching position of the switch valve through the first operating connection and further through the opening check valve into an opening of the capture element and can be supplied to the MKS chamber of the connecting rod through the second operating connection. In a direction of the GKS chamber, however, the check valve blocks so that the MKS chamber is blocked against emptying. This way quick filling of the MKS chamber can be provided.

According to another aspect of the invention a connecting rod for an internal combustion engine with variable compression with an eccentrical element adjustment device is proposed for adjusting an effective connecting rod length through a hydraulic arrangement, wherein the eccentrical element adjustment arrangement includes at least a first cylinder and a second cylinder and wherein respectively an inlet for feeding hydraulic fluid into the cylinders through a supply conduit as well as also an outlet for draining the hydraulic fluid from the cylinders is provided.

Advantageously the connecting rod can include at least one switch valve wherein the switch valve includes a movable piston, in particular a capture element which is optionally movable into a first switching position or a second switching position, wherein the drain of the first cylinder is connected with the supply conduit in the first switching position and the drain of the second cylinder is connected with the supply conduit in the second switching position. A respective check valve is associated with the cylinders, wherein the check valve facilitates feeding the hydraulic fluid into the cylinders and prevents a draining of the hydraulic fluid from the cylinders. Thus, the cylinders are connected so that hydraulic fluid is transferable in the first switching position from the first cylinder into the second cylinder.

Advantageously the check valve facilitates a safe filling of the MKS chamber directly from the volume of the GKS chamber. It is also prevented that the connecting rod changes its position from a low compression position unintentionally into a high compression position under certain operating conditions. In particular at high speeds of the internal combustion engine it can occur that the MKS chamber cannot be safely filled from the supply conduit of the hydraulic fluid upstream of the MKS chamber since the mass and pressure forces for opening the check valve become more and more disadvantageous for increasing speeds. The MKS chamber can empty due to the leakage but may not be filled any more due to the check valve not opening. A check valve in front of the GKS chamber is not subject to these conditions so that the GKS chamber fills slowly. Since there are no gas forces and only mass forces are at work the GKS chamber does not empty any more.

Due to the switch valve with the integrated check valve this situation can be circumvented since the MKS chamber can be filled directly from the volume of the hydraulic fluid of the GKS chamber. Thus, the check valve prevents advantageously that the MKS chamber can empty back again into the GKS chamber.

The capture element can be movably arranged for example in a bore hole of the valve housing and can be optionally displaceable into the first switching position or the second switching position wherein the drain of the first cylinder is connected with the switch valve in the first switching position and the drain of the second cylinder is connected with the switch valve of the second switching position. Thus, hydraulic fluid from the drain of the first cylinder can be conducted in the first switching position of the switch valve according to the invention from the first operating connection of the switch valve through the check valve to the second operating connection and can thus be used for filling the second cylinder. Thus, it is advantageously prevented that the hydraulic fluid has to be returned first through the supply connection of the switch valve which leads into a supply conduit to a tank and can only be fed to the second cylinder through the supply conduit out of the tank again.

Thus, in the first switching position of the switch valve hydraulic fluid can drain for example from the GKS chamber of the connecting rod through the first operating connection and then further through the opening check valve into an opening of the capture element and can be fed to the MKS chamber of the connecting rod through the second operating connection. However, in a direction towards the GKS chamber the check valve blocks so that the MKS chamber is secured against emptying. This way quick filling the MKS chamber is facilitated.

Simultaneously superfluous hydraulic fluid can drain in a throttled manner through the supply connection in a direction towards the supply conduit when the volume of the GKS chamber is greater than the volume of the MKS chamber.

Feeding the hydraulic fluid through the second operating connection of the check valve can thus be advantageously performed in a throttled manner in order to achieve a stable function of the eccentrical element adjustment device. Throttling the second operating connection can be advantageously performed also downstream of the switch valve.

In the second switching position of the switch valve, however, the check valve blocks in a direction towards the GKS chamber so that the hydraulic fluid cannot be conducted from the MKS chamber directly into the GKS chamber of the connecting rod, but is first drained in a throttled manner into the supply connection of the switch valve and thus into the supply conduit of the connecting rod. The GKS chamber can only be filled through a feeding of hydraulic fluid through the supply conduit from the hydraulic fluid supply.

In the first switching position this connection of the switch valve with the eccentrical element adjustment device corresponds to a position with low compression $\varepsilon_{low}$ of the connecting rod, whereas the second switching position corresponds to a position with high compression $\varepsilon_{high}$ of the connecting rod.

According to an advantageous embodiment at least one of the check valves can include at least one closure element which is configured as an elastic annular band and at least partially envelops a circumference of a valve body. The closure element is advantageously configured as an annular band, for example an elastic sheet metal band, which can be slotted at its circumference at a location so that it can be expanded in a radially outward direction or compressed in an inward direction. An elastic sheet metal band of this type has enough intrinsic tension to close an opening, advantageously on a circumference of a cylindrical valve element by the spring tension. The closure element can release the fluid path through a sufficiently high hydraulic pressure in a pass through direction while the fluid path is blocked in the opposite direction by the hydraulic pressure upon the closure element. This way the function of a check valve can be implemented in a simple and cost effective manner. No additional components are required since the closure element and the spring element are implemented in one component. By selecting a suitable elastic sheet metal band as a ring band the required pressure for opening the closure element can be adjusted, for example by the sheet metal thickness. Furthermore the ring band configured as the closure element saves a large amount of installation space so that a compact configuration of the check valve can be implemented. A check valve of this type has a robust function and a high level of reliability and service life. Due to the compact arrangement of the closure element it can be mounted in a simple manner and can be integrated into a connecting rod easily.

BRIEF DESCRIPTION OF THE DRAWINGS

Additional advantages can be derived from the subsequent drawing description. The drawings schematically illustrate an embodiment of the invention. The drawings, the description and the claims include numerous features in combination. A person skilled in the art will advantageously view the features individually and combine them into additional further combinations, wherein:

FIG. 15 illustrates the connecting rod in the longitudinal sectional view in FIG. 16 with an illustrated sectional view B-B;

FIG. 16 illustrates the connecting rod in the longitudinal sectional view B-B in FIG. 15 with the illustrated sectional plane A-A;

FIG. 17 illustrates the enlarged detail X of the connecting rod FIG. 13;

FIG. 18 illustrates the enlarged detail Y of the connecting rod in FIG. 14;

FIG. 29 illustrates the connecting rod in a longitudinal sectional view A-A in FIG. 28 with an illustrated sectional plane B-B;

FIG. 30 illustrates the connecting rod in a longitudinal sectional view B-B of FIG. 29 with an illustrated sectional plane A-A;

FIG. 31 illustrates the enlarged detail X of the connecting rod in FIG. 27;

FIG. 32 illustrates the enlarged detail Y connecting rod in FIG. 28;

DETAILED DESCRIPTION OF THE INVENTION

Figure 1:
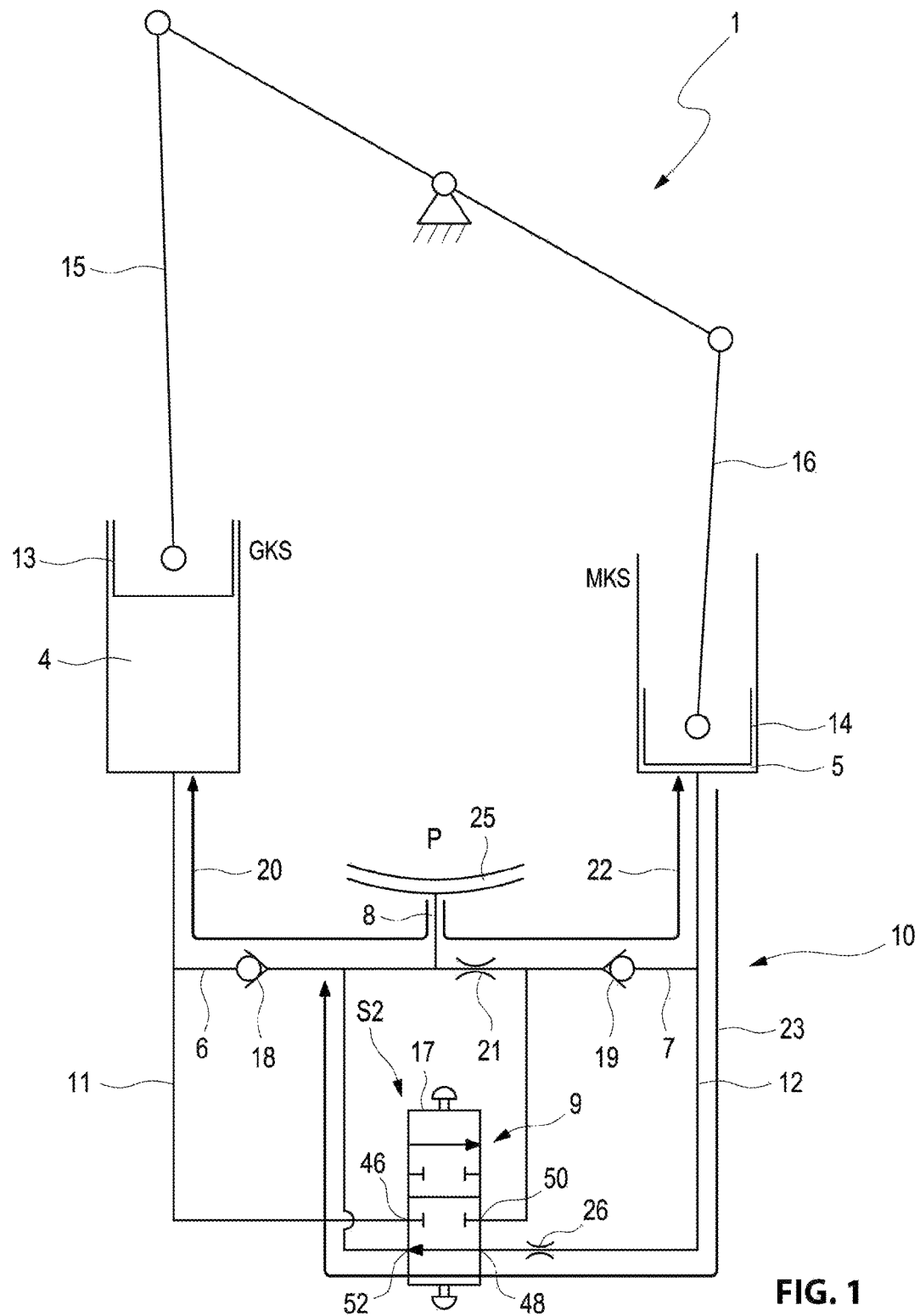
FIG. 1 illustrates a hydraulic arrangement according to the invention in a second switching position for high compression in a schematic view.

In the drawing figures identical or like components are designated with identical reference numerals. The drawing figures only illustrate embodiments and do not limit the spirit and scope of the invention.

FIGS. 1-8 illustrate embodiments of a hydraulic arrangement 10 according to the invention. A connecting rod 1 in which the hydraulic arrangement 10 according to the invention is advantageously used is only schematically illustrated in these drawing figures.

FIG. 1 illustrates a hydraulic arrangement 10 according to the invention in a second switching position S2 for high compression $\varepsilon_{high}$ in a schematic illustration.

The hydraulic arrangement 10 includes a switch valve 9 for controlling a hydraulic fluid flow of the connecting rod 1 for an internal combustion engine with variable compression with an eccentrical element adjustment device 3 for adjusting an effective connecting rod length. The eccentrical element adjustment device 3 includes a first cylinder 4 and a second cylinder 5 configured as hydraulic chambers wherein an inlet 6, 7 for feeding hydraulic fluid into the cylinders 4, 5 through a supply conduit 8 as well as a drain 11, 12 for draining hydraulic fluid from the cylinder 4, 5 are provided. The switch valve 9 includes a movable piston 17 which is optionally movable into a first switching position S1 or a second switching position S2 wherein in the first switching position S1 the outlet 11 of the first cylinder 4 is connected with the supply conduit 8 and in the second switching position S2 the outlet 12 of the second cylinder 5 is connected with the supply conduit 8.

Thus, the cylinder 4 represent a hydraulic chamber on the gas force side (GKS) of the connecting rod 1, whereas the cylinder 5 represents a hydraulic chamber on the mass force side of the connecting rod 2.

A respective check valve 18, 19 is associated with the cylinders 4, 5, wherein the check valve facilitates feeding hydraulic fluid into the cylinders 4, 5 and prevents a draining of the hydraulic fluid of the cylinders 4, 5. The inlet 6, 7 and the outlet 11, 12 of a cylinder 4, 5 respectively lead in a common conduit into the cylinder 4, 5. Advantageously only two check valves 18, 19 are required according to the invention. Additional check valves do not have to be provided.

The switch valve 9 includes a valve body 64 and a movable piston 17 which is optionally displace able into a first switching position S1 or a second switching position S2, wherein at least a first operating connection 46 is connected with the first supply connection 50 in the first switching position S1 and at least one second operating connection 48 is connected with a second supply connection 52 in the second switching position S2. The movable piston 17 of the switch valve 9 is configured as a capture element. A hydraulic fluid conduit between an operating connection 46, 48 and a supply connection 50, 52 can thus include at least one check valve 18, 19 and at least one throttling location 21, 26.

In the first switching position S1 the first outlet 11 is connected with the supply conduit 8 and in the second switching position S2 the second outlet 12 is connected with the supply conduit 8. Thus, the chambers 4, 5 are connected so that hydraulic fluid can be conducted from the GKS chamber 4 in the position $\varepsilon_{low}$ directly in an un-throttled manner and into the MKS chamber 5.

The outlet 11 of the GKS chamber 4 is connected with the first operating connection 46 of the capture element 17, whereas the inlet 6 between the bearing shell 25 is connected with the hydraulic supply P and the check valve 18 with the second supply connection 52. The outlet 12 of the MKS chamber 5 is connected with the second operating connection 48 and the inlet 7 is connected with the first supply connection 50. The connection between the operating connections 46, 48 and the supply connections 50, 52 is defined by the internal conduit routing of the capture element 17 according to the switching position S1, S2 of the capture element 17 and thus of the switch valve 9.

In the second switching position S2 hydraulic fluid is transferable from the second cylinder 5 into the first cylinder 4. The drain 12 of the second cylinder advantageously includes a throttling location 26.

The drain 11 of the GKS chamber 4 is closed by the switch valve 9. Hydraulic fluid can flow through the check valve 18 in the infeed 6 which is indicated by the hydraulic flow 20. Thus, the check valve 18 is arranged so that a hydraulic flow 20 is only possible in the filling direction. The GKS chamber 4 fills with hydraulic fluid.

The drain 12 of the MKS chamber 5 is opened by the switch valve 9. Thus, the volume flow is conducted through a throttling location 26. A hydraulic flow in both flow directions 22, 23 is possible.

Hydraulic fluid can flow through the check valve 19, thus the check valve 19 is arranged so that a hydraulic flow 22 is only possible in filling direction. The volume flow is run through the throttle/aperture 21. The MKS chamber 5 empties.

Figure 2:
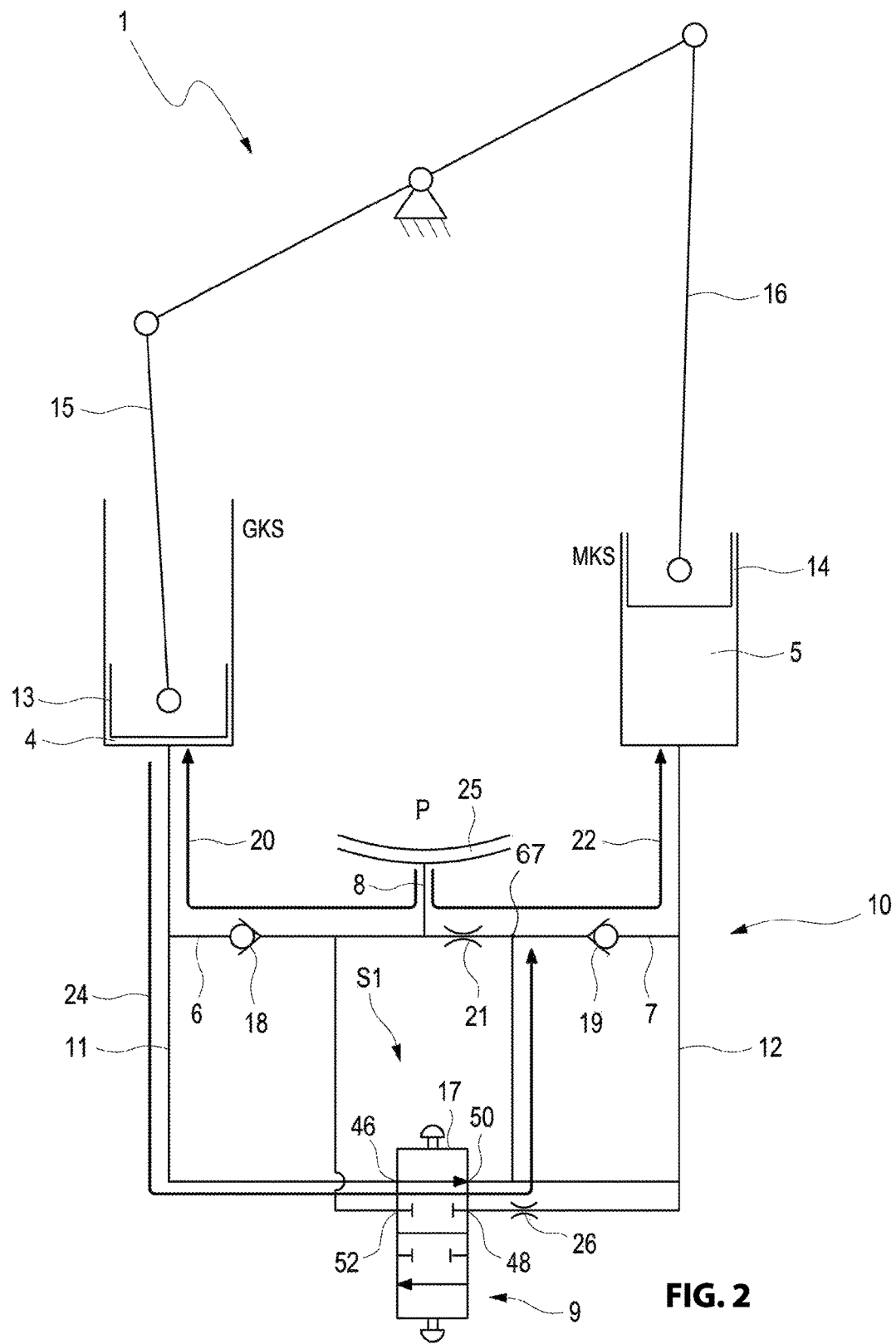
FIG. 2 illustrates the hydraulic arrangement of FIG. 1 in a first switching position for low compression.

FIG. 2 illustrates the hydraulic arrangement 10 of FIG. 1 in a first switching position S1 for low compression $\varepsilon_{low}$. The cylinders 4, 5 are thus connected so that hydraulic fluid is conductible from the first cylinder 4 into the second cylinder 5 in the first switching position S1. The hydraulic connection for filling the second cylinder 5 from the first cylinder 4 is provided without throttle. Between the supply conduit 8 and the inlet 7 of the second cylinder 5 however a throttling location 21 is arranged.

The outlet 11 of the GKS chamber 4 is opened by the switch valve 9 as indicated by the hydraulic flow 24. The volume flow can run un-throttled in a direction towards the check valve 19 of the MKS chamber 5. The excess volume flow in a direction of the bearing shell 25 is conducted through the throttling location 21. As evident from FIG. 2 the throttling location 21 is arranged between a branching point 67 of the outlet 4 and the hydraulic supply P so that the hydraulic fluid can flow into the MKS chamber 5 un-throttled. At the branch off point 67 the outlet 11 of the GKS chamber 4 branches into the inlet 7 of the MKS chamber 5 and the supply conduit 8.

Hydraulic fluid can flow through the check valve 18 of the GKS chamber 4. Thus, the check valve 18 is arranged so that a hydraulic flow is only possible in filling direction. The GKS chamber 4 empties.

The outlet 12 of the MKS chamber 5 is closed by the switch valve 9.

Hydraulic fluid can flow through the check valve 19 of the MKS chamber 5. Thus, the check valve is arranged so that a hydraulic flow 22 is only possible in the filling direction. The MKS chamber 5 fills with hydraulic fluid.

The switch valve 9 can be mechanically actuated like in the described embodiment of the connecting rod 1, however using a hydraulically actuated valve (hydraulic valve) is also feasible according to the spirit and scope of the invention.

The hydraulic arrangement 10 according to the invention facilitates position stability of the eccentrical element adjustment arrangement of the connecting rod 1 in the low compression position $\varepsilon_{low}$ in particular at high engine speeds.

The speed driven acceleration of the rather long hydraulic fluid columns arranged in the cylinders 4, 5 of the connecting rod 1 generate pressure differences. The pressure differences can have positive effects and negative effects, this means the hydraulic fluid columns can be accelerated so that emptying and filing of the chambers 4, 5 is supported but also that it is counter acted. In particular on the MKS side this effect can have a negative impact. The acceleration of the hydraulic fluid columns can have the effect that no positive pressure difference is formed any more in front and behind the MKS check valve 19, wherein the pressure difference has the effect that the hydraulic fluid can be conducted into the MKS chamber 5. Since the chambers 4, 5 always lose hydraulic fluid through leakage and other effects this causes an incremental slow adjustment of the eccentrical element over plural revolutions and thus of the effective length of the connecting rod 1 from the position $\varepsilon_{low}$ to $\varepsilon_{high}$, the so called drifting. This occurs in particular for engine load cases with high mass forces (tension force and pressure force at connecting rod 1) and low gas forces (compression force at the connecting rod 1). A possible adjustment of the connecting rod 1 in the position $\varepsilon_{high}$ by mass forces in the tension direction cannot be reset completely by the mass forces in the pressure direction and the gas forces. This effect is prevented by the hydraulic arrangement 10 according to the invention. This is performed as already described supra in that the GKS chamber 4 conducts it's received hydraulic fluid in the position $\varepsilon_{low}$ directly and in an un-throttled manner in the MKS chamber 5. The hydraulic fluid which is conducted by the GKS chamber 4 through the gas forces impacting the connecting rod 1 and the mass forces in pressure direction into the MKS chamber 5 has a much higher pressure in most engine operating points than the hydraulic pressure in the hydraulic supply P of the bearing shell 25. Thus, the hydraulic fluid can be pressed from the GKS chamber 4 into the MKS chamber 5 and the MKS chamber 5 is hydraulically preloaded.

In addition to the global position stability in the position $\varepsilon_{low}$, this means after one revolution the connecting rod 1 is in its end position $\varepsilon_{low}$ again, also the position stability over the revolution or the stiffness of the connecting rod 1 will increase.

During a revolution there is always a lever movement since the hydraulic fluid columns also have a certain degree of flexibility so that a certain sinking of the support piston occurs in the filled chambers 4, 5. When the connecting rod 1 resets completely towards the end of the revolution this is called "position stable". Still an angle change at the eccentrical element, or the lever assembly is undesirable since the respective support piston can hit the bottom of the chamber during resetting. The adjustment speed can thus be advantageously limited by aperture bore holes of the throttling locations 21, 26. A pressure loaded preloaded MKS hydraulic fluid column sinks less than a non-preloaded hydraulic fluid column. Less sinking means less lever movement and thus position stability in the position $\varepsilon_{low}$ can be improved.

The hydraulic conduit from the GKS chamber 4 in a direction towards the bearing shell 25 with the throttling location 21 is advantageous since the chambers 4, 5 have different sizes, this means the volume difference from the larger GKS chamber 4 which is not absorbed by the MKS chamber 5 can be drained in a direction towards the bearing shell 25 since otherwise the GKS chamber 4 would always fill and the eccentrical element adjustment arrangement would always arrive at the $\varepsilon_{high}$ position irrespective of the switching. A hydraulic pressure is formed upstream of the hydraulic supply P of the bearing shell 25 and thus also upstream of the check valve 19. Through the forced connection of the two support pistons (GKS piston and MKS piston) through the lever assembly the differential volume flow in the position $\varepsilon_{low}$ wherein the differential volume flow flows in a direction towards the bearing shell 25 can be advantageously throttled in order to limit the adjustment speed of the GKS piston since the MKS chamber 5 cannot receive the entire volume of the hydraulic fluid which is provided by the GKS chamber 4. The throttling location 21 which is arranged between the branch off point 67 and the hydraulic supply P as described supra causes a braking of the GKS piston which generates a respective pressure upstream of the check valve 19 of the MKS chamber 5 so that the MKS chamber 5 can be safely filled in the first switching position S1.

Figure 3:
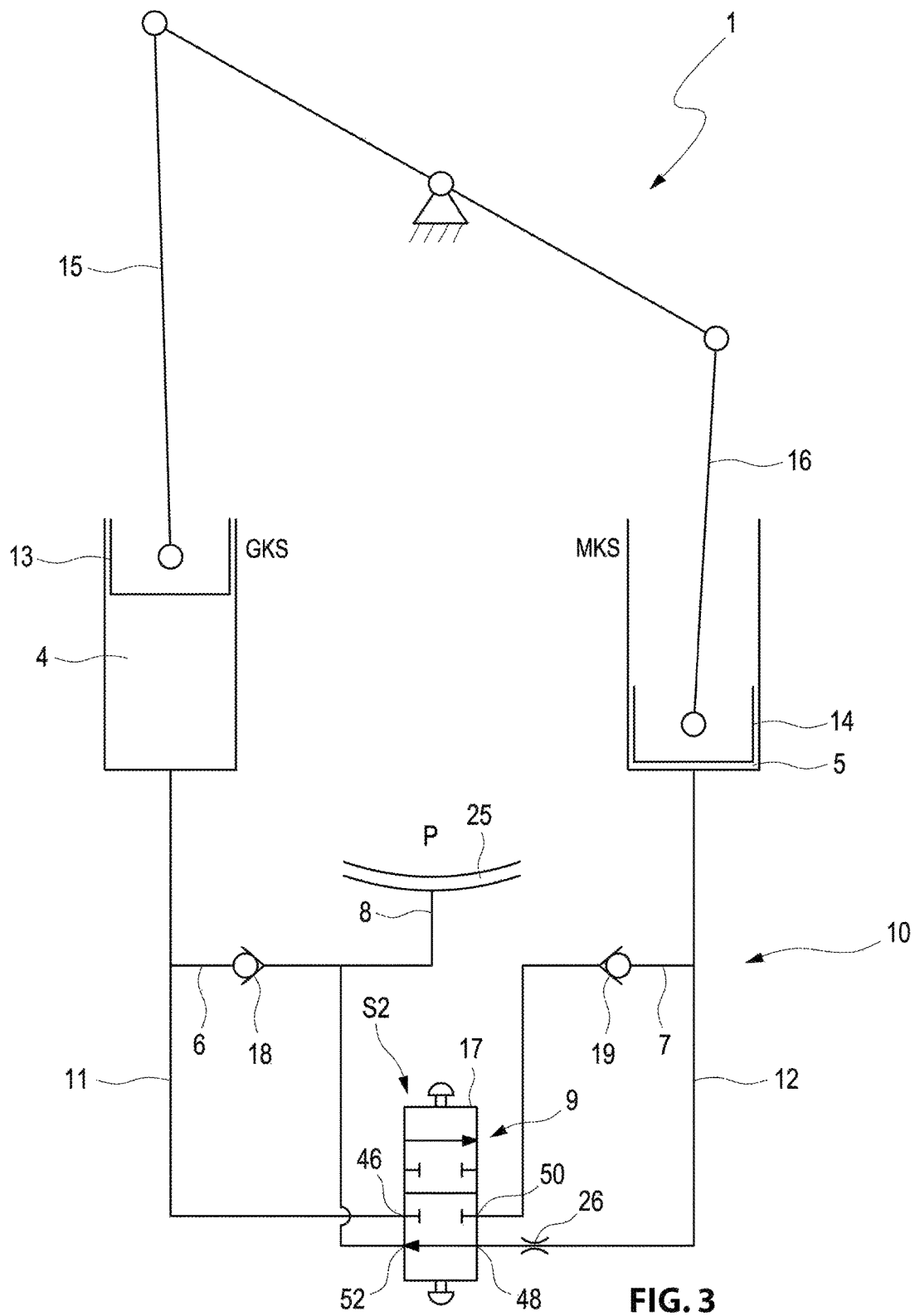
FIG. 3 illustrates a hydraulic arrangement according to another embodiment of the invention in a second switching position.
Figure 4:
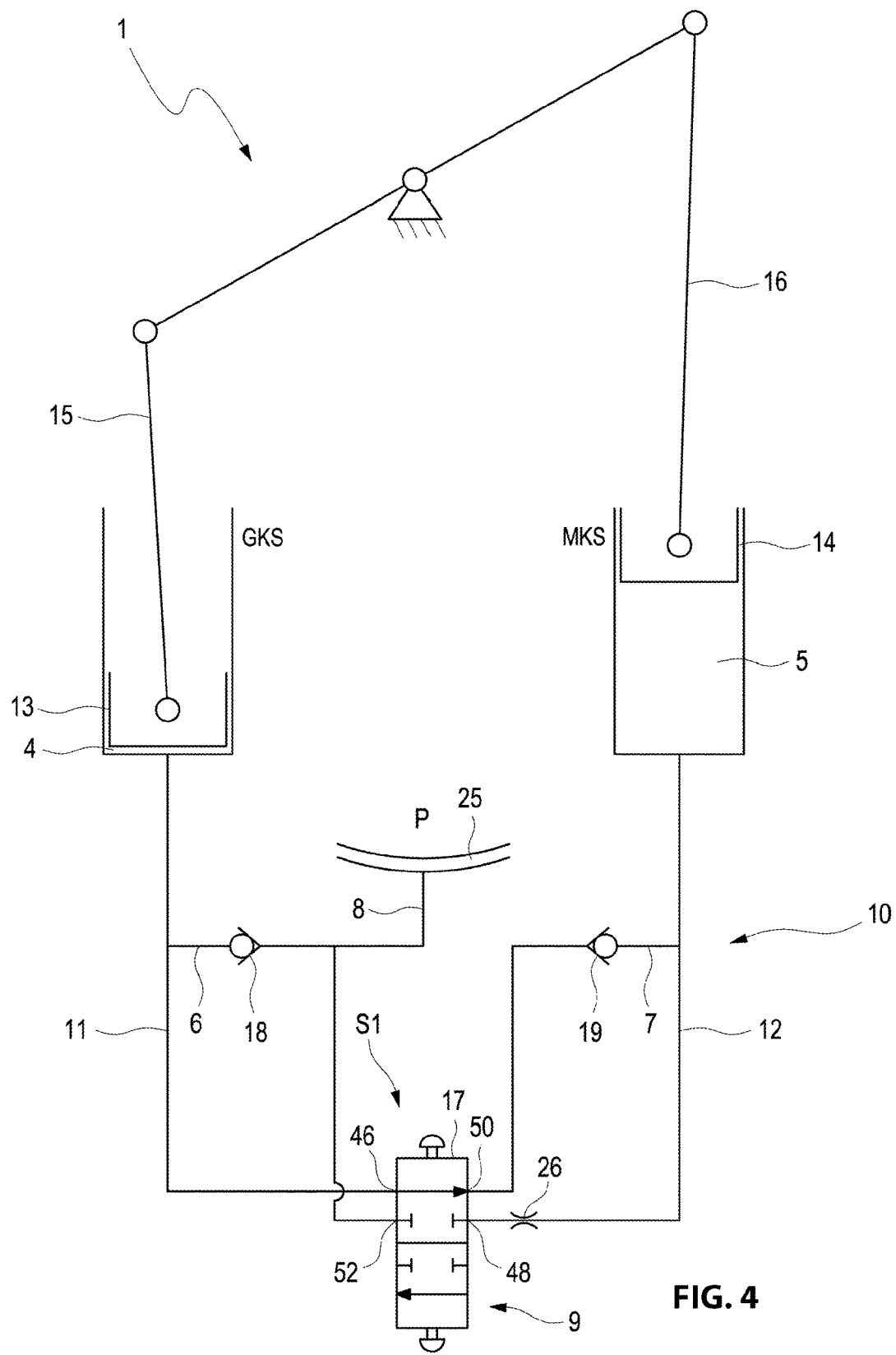
FIG. 4 illustrates the hydraulic arrangement of FIG. 3 in the first switching position.

FIG. 3 illustrates a hydraulic arrangement 10 according to another embodiment of the invention in the second switching position S2, whereas FIG. 4 illustrates the hydraulic arrangement 10 of FIG. 3 in the first switching position S1. In this embodiment the cylinder 4 forming the GKS chamber and the cylinder 5 forming the MKS chamber have the same adjustment volumes. Thus, the connection from the GKS chamber 4 to the bearing shell 25 with the throttling location 21 can be omitted. The GKS chamber 4 conducts the entire volume of the hydraulic fluid in an un-throttled manner into the MKS chamber 5. The MKS chamber 5 has no direct and permanent connection anymore with the hydraulic supply P through the bearing shell 25.

Figure 5:
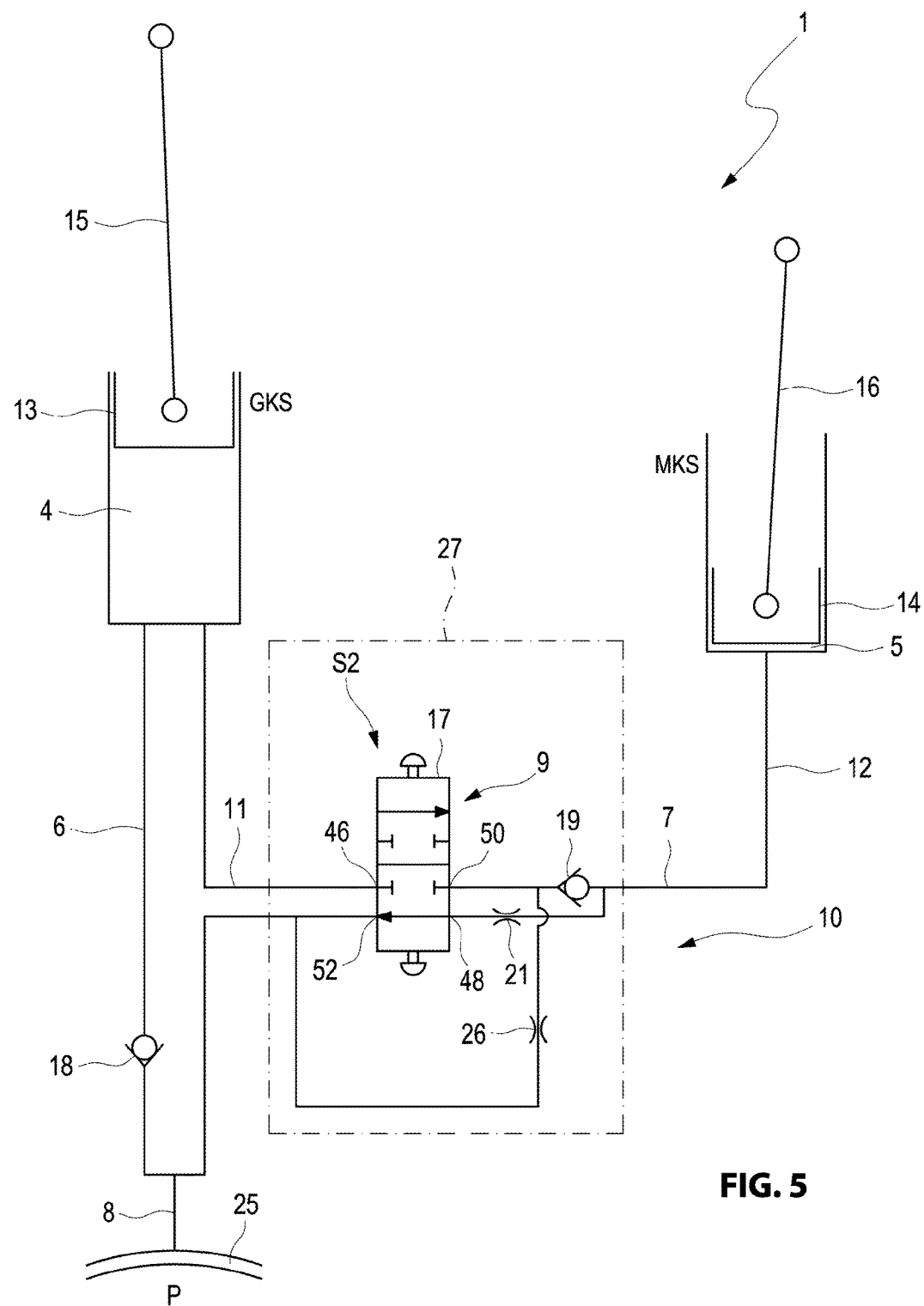
FIG. 5 illustrates a hydraulic arrangement according to another embodiment of the invention in the second switching position.
Figure 6:
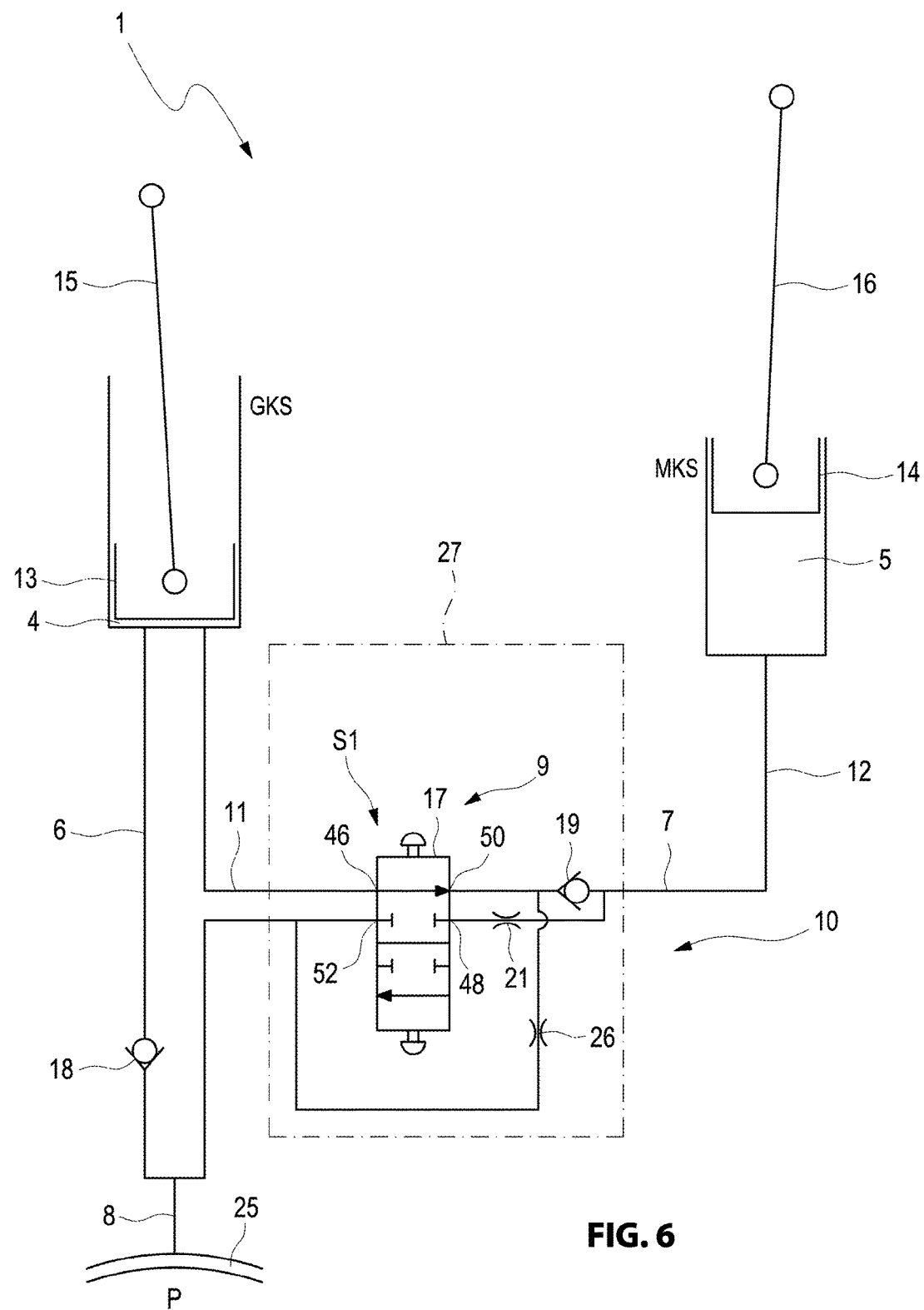
FIG. 6 illustrates the hydraulic arrangement according to FIG. 5 in the first switching position.

FIG. 5 illustrates a hydraulic arrangement 10 according to another embodiment of the invention in the second switching position S2 and in FIG. 6 in the first switching position S1. The cylinders 4, 5 like in the first embodiment in FIGS. 1 and 2 have different adjustment volumes of the GKS chamber 4 and the MKS chamber 5. The switch valve 9, the throttling locations 21, 26 as well as the check valve 19 of the MKS chamber 5, however, are integrated in this embodiment in a closed and separate hydraulic module 27. The hydraulic module 27 can be mounted in the connecting rod 1 in a simple manner so that also machining the connecting rod 1 can be simplified. Optionally also only the switch valve 9, the throttling locations 21, 26, and/or at least one of the check valves 18, 19 can be integrated in the closed hydraulic module 27.

Figure 7:
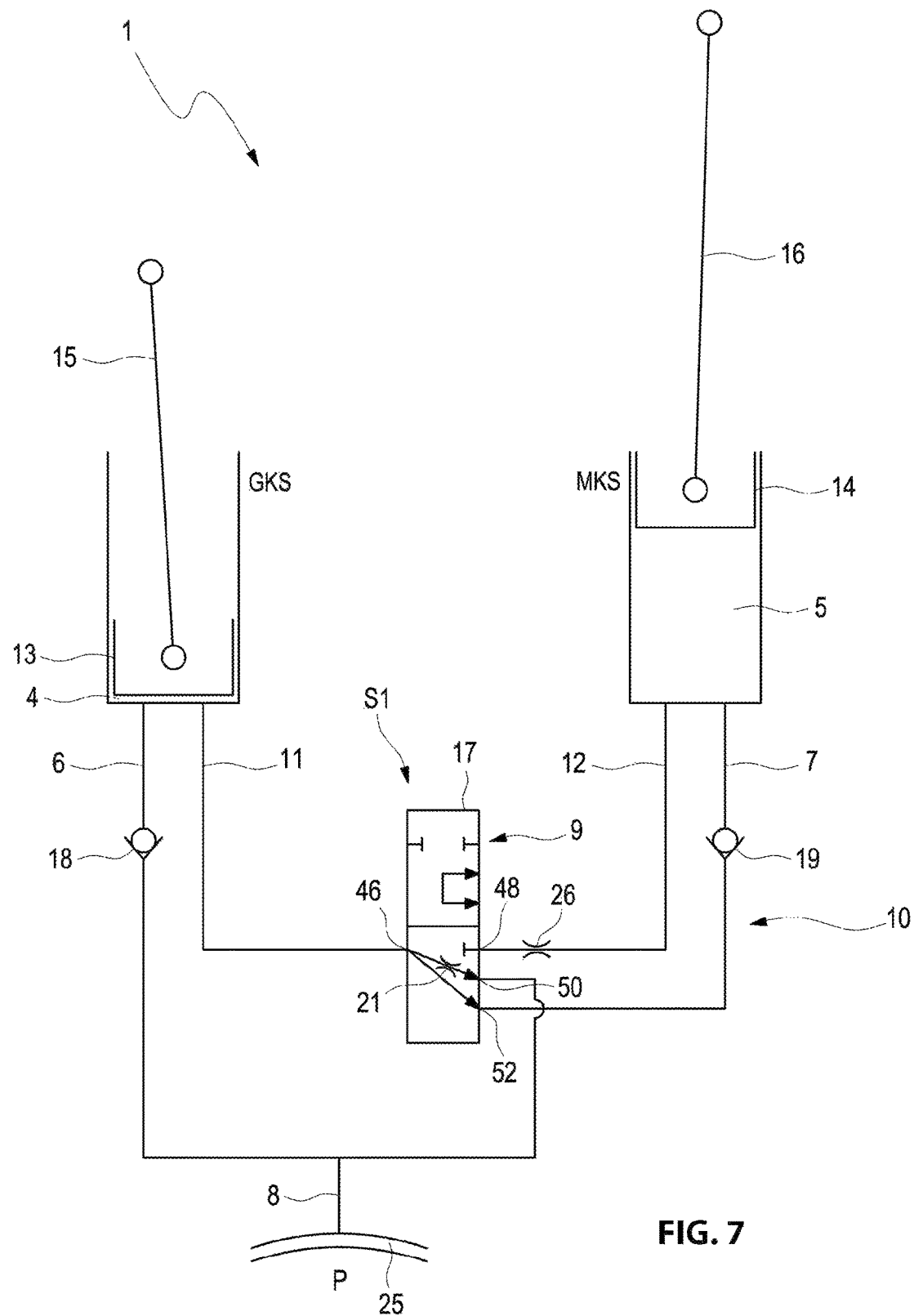
FIG. 7 illustrates a hydraulic arrangement according to another embodiment of the invention in the first switching position for low compression.

FIG. 7 illustrates a hydraulic arrangement 10 according to another embodiment of the invention in the first switching position S1 for a position with low compression $\varepsilon_{low}$. In this embodiment one of the throttling locations 21 is integrated into the capture element 17 of the switch valve 9. The drain 11 of the GKS chamber 4 opens into the first operating connection 46 of the capture element 17 from where the hydraulic fluid is conducted in the first switching position S1 through the check valve 19 into the MKS chamber 5 and through the throttling location 21 into the bearing shell 25. The outlet 12 of the MKS chamber 5 is blocked by the capture element 17.

Figure 8:
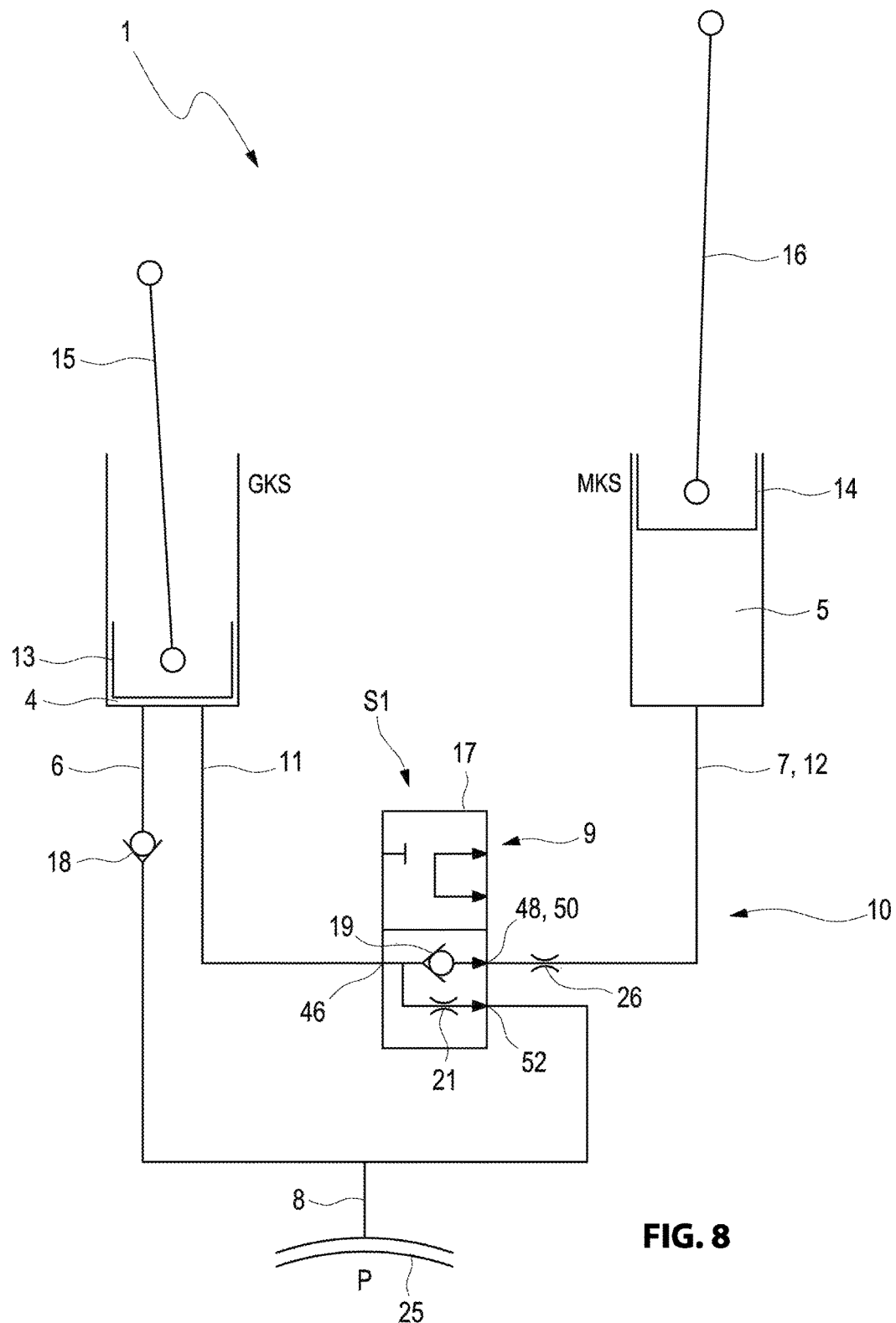
FIG. 8 illustrates a hydraulic arrangement according to another embodiment of the invention in the first switching position for low compression.

FIG. 8 illustrates a hydraulic arrangement 10 according to another embodiment of the invention in the first switching position S1 for a low compression $\varepsilon_{low}$ where one of the check valves 19 and one of the throttling locations 21 is integrated into the capture element 17 of the switch valve 9. Also in this embodiment the drain 11 of the GKS chamber 4 leads into the first operating connection 46 of the capture element 17 from where the hydraulic fluid is conducted in the first switching position S1 through the check valve 19 into the MKS chamber 5 and through the throttling location 21 into the bearing shell 25. The inlet 7 and the outlet 12 are run into the MKS chamber as a single hydraulic conduit so that filling the MKS chamber is performed in any case through the throttling location 26. The second operating connection 48 and the first supply connection 50 are thus combined.

FIGS. 9-36 include particular embodiments of the connecting rod 1 according to the invention with a corresponding switch valve 9. FIGS. 9-22 illustrate the connecting rod 1 and the switch valve 9 in the high compression position $\varepsilon_{high}$. FIGS. 23-36 illustrate the switch valve 9 in the low compression position $\varepsilon_{low}$.

Figure 11:
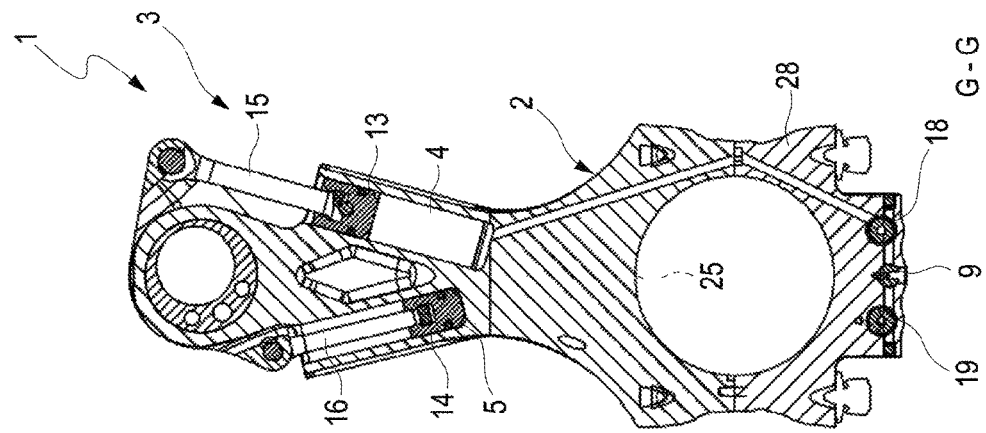
FIG. 11 illustrates the connecting rod in the longitudinal sectional view G-G in FIG. 9.
Figure 9:
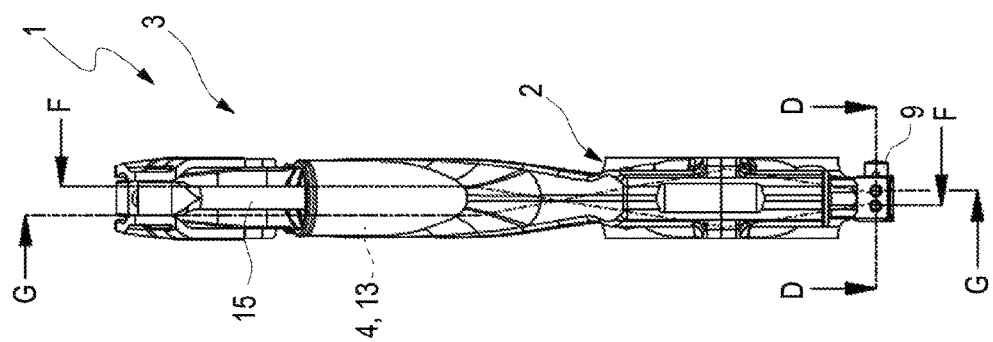
FIG. 9 illustrates a connecting rod according to the invention in the position for high compression in a side view with illustrated sectional planes D-D, F-F and G-G.
Figure 10:
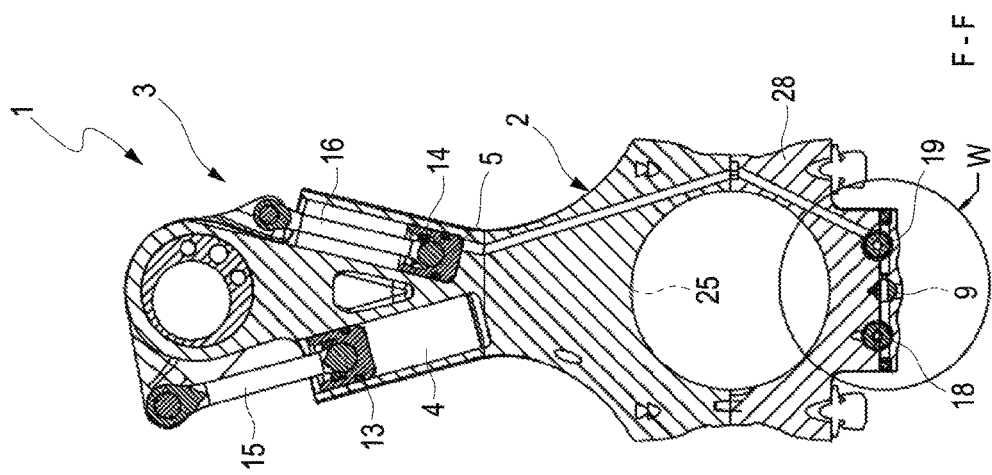
FIG. 10 illustrates the connecting rod in the longitudinal sectional view F-F of FIG. 9 with an illustrated blown up detail W.
Figure 12:
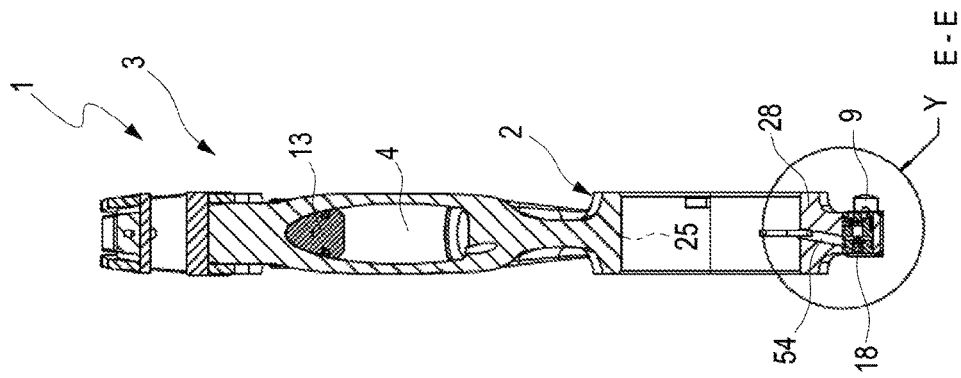
FIG. 12 illustrates the connecting rod in a front view with illustrated sectional planes C-C and E-E.
Figure 13:
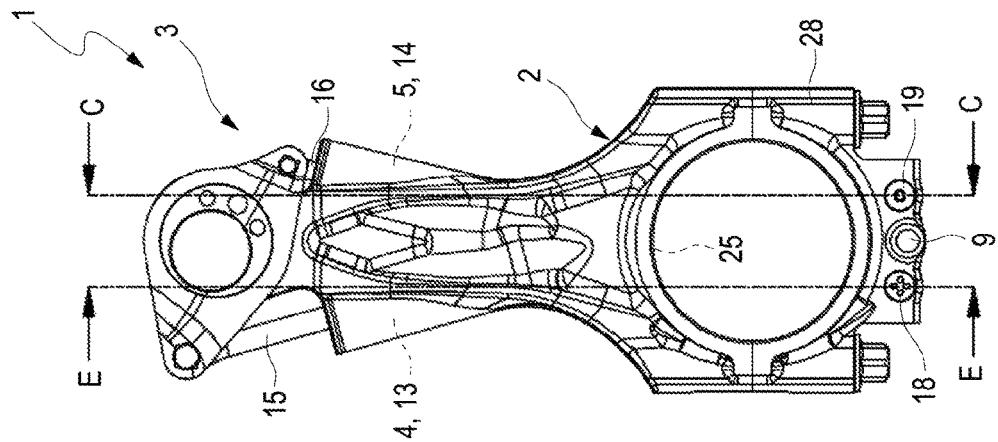
FIG. 13 illustrates the connecting rod in the longitudinal sectional view C-C in FIG. 12 with an illustrated blown up detail X.
Figure 14:
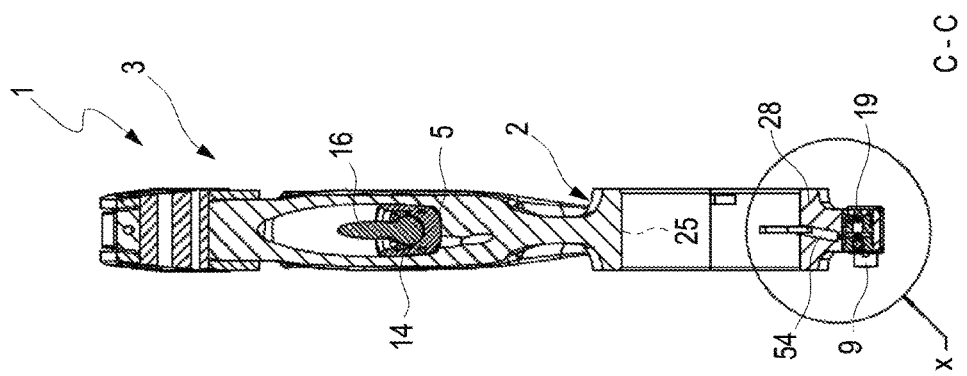
FIG. 14 illustrates the connecting rod in a longitudinal sectional view E-E in FIG. 12 with an illustrated blown up detail Y.

FIG. 9 illustrates a connecting rod 1 according to the invention in the high compression position $\varepsilon_{high}$ in a side view with illustrated sectional planes D-D, F-F and G-G. The two longitudinal sectional views F-F and G-G are illustrated in FIGS. 10 and 11. FIG. 12 illustrates the connecting rod 1 in a front view with illustrated sectional planes C-C and E-E which are illustrated in FIGS. 13 and 14. FIGS. 15 and 16 illustrate additional longitudinal sectional views A-A and B-B.

The connecting rod 1 for an internal combustion engine with variable compression includes a connecting rod body 2 and an eccentrical element adjustment device 3 for adjusting an effective connecting rod length with one of the hydraulic arrangement 10 described in FIGS. 1-8. The eccentrical element adjustment device 3 includes a first cylinder 4 (GKS chamber) and a second cylinder 5 (MKS chamber). An inlet 6, 7 for feeding hydraulic fluid into the cylinders 4, 5 through a supply conduit 8 as well as a respective drain 11, 12 for draining hydraulic fluid from the cylinders 4, 5 is provided.

The eccentrical element adjustment device 3 according to the illustrated advantageous embodiment can include two cylinders 4, 5 with a respective piston 13, 14 that is movably supported in a cylinder bore hole and which is connected with a support rod 15, 16.

The connecting rod 1 includes a switch valve 9 which includes a movable piston 17, in particular a capture element which is optionally movable into a first switching position S1 or a second switching position S2. Thus, in the first switching position S1 the drain 11 of the first cylinder 4 is connected with the supply connection 8 and in the second switching position S2 the drain 12 of the second cylinder 5 is connected with the supply conduit 8. A respective check valve 18, 19 is associated with the cylinders 4, 5 wherein the check valve facilitates feeding hydraulic fluid into the cylinders 4, 5 and prevents a draining of hydraulic fluid from the cylinders 4, 5. The cylinder 4, 5 are connected so that in the first switching position S1 hydraulic fluid is transferable from the first cylinder 4 into the second cylinder 5.

As evident for example in FIGS. 10 and 11 the switch valve 9 and the two check valves 18, 19 are arranged in the connecting rod cover 28 below the bearing shell 25 and connected by hydraulic conduits with the cylinders 4, 5 and with the hydraulic supply through the bearing shell 25. The switch valve 9, however, as a matter of principle can be arranged at any location in the connecting rod 1.

FIGS. 17 and 18 in blown up details X and Y of the connecting rod 1 in FIGS. 13 and 14 illustrate longitudinal sectional views through the two check valves 19, 18. Behind the check valves 18, 19 a respective capture element 17 of the switch valve 9 is visible which protrudes from the connecting rod cover 28. The sectional view respectively illustrates a cut hydraulic conduit 54 which is used for feeding or draining hydraulic fluid to the check valve 18, 19. At least one of the check valves 18, 19 which is illustrated in detail in FIGS. 37-44 can advantageously include at least one closure element 30, c.f. FIG. 42 which is configured as an elastic annular band and which at least partially envelops a valve body 44 at its circumference.

Figure 19:
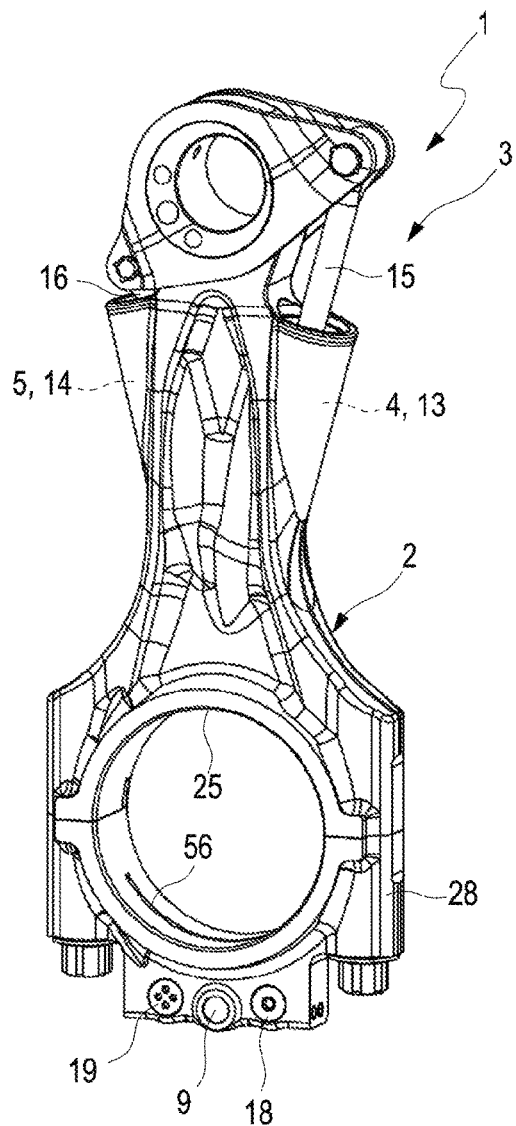
FIG. 19 illustrates the connecting rod of FIG. 9 in an isometric view.

FIG. 19 illustrates the connecting rod according to FIG. 9 in an isometric view. Thus, within the bearing shell 25 in the portion of the connecting rod cover 28 a groove 56 is visible on an interior circumference of the bearing shell 25, wherein the groove is provided for the hydraulic supply of the eccentrical element adjustment device 3 through the check valves 18, 19 and/or the switch valve 9.

Figure 20:
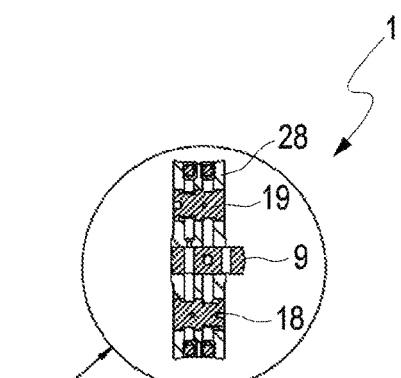
FIG. 20 illustrates the connecting rod in a cross section D-D in FIG. 9 with an illustrated blown up detail Z.
Figure 21:
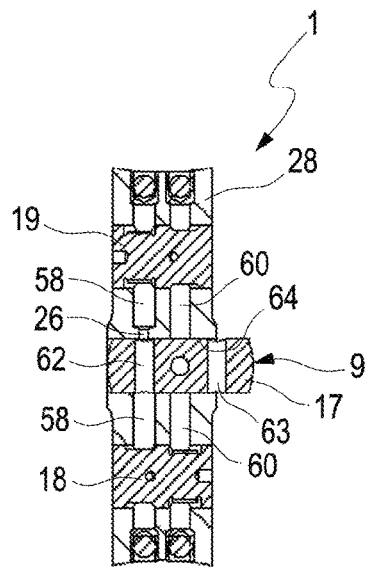
FIG. 21 illustrates the blown up detail Z of the connecting rod in FIG. 20.

FIG. 20 illustrates the connecting rod 1 in a cross sectional view D-D in FIG. 9 with an illustrated enlarged detail Z which is illustrated in FIG. 21.

Hydraulic conduits 58, 60 are illustrated in the cross section in FIG. 21 which are connected with one another by the check valves 18, 19 or the switch valve 9 and/or which can be switched through. For this purpose the capture element 17 that is supported in the valve body 64 includes transversal bore holes 62, 63 which depending on the switching position S1, S2 can cause a pass through of the hydraulic conduits 58, 60. In order to implement the switching positions S1, S2 the capture element 17 is displaceable along its longitudinal axis in the valve body 64. In the high compression position $\varepsilon_{high}$ the hydraulic conduit 58 is switched through by the bore hole 62 of the capture element 17 while the hydraulic conduit 60 is blocked. Thus, FIG. 22 illustrates an enlarged detail W of the connecting rod 10 in a longitudinal sectional view in which the bore hole 62 is visible in the capture element 17, which represents a pass through for the hydraulic conduit 58.

Figure 22:
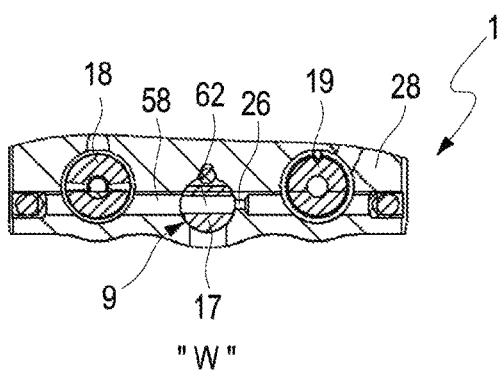
FIG. 22 illustrates the blown up detail W of the connecting rod in FIG. 10.

FIGS. 21 and 22 also illustrate an implementation of the throttling location 26 as a constriction in the hydraulic conduit 58.

Figure 25:
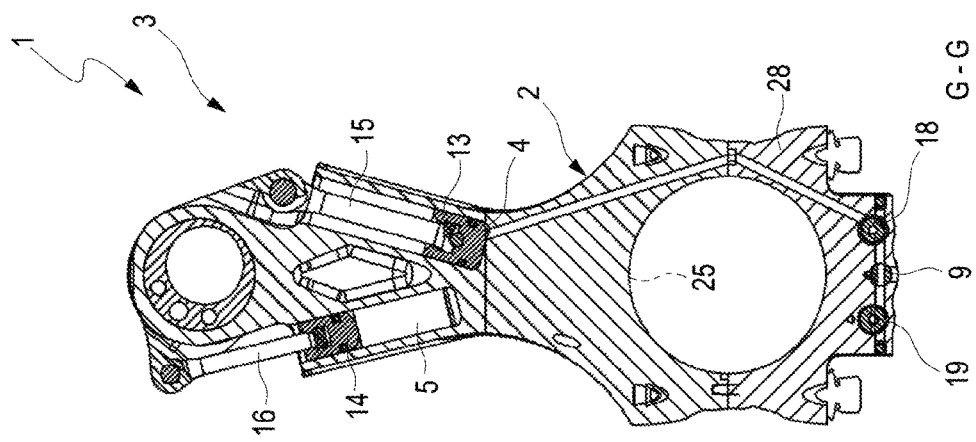
FIG. 25 illustrates the connecting rod in a longitudinal sectional view G-G in FIG. 23.
Figure 23:
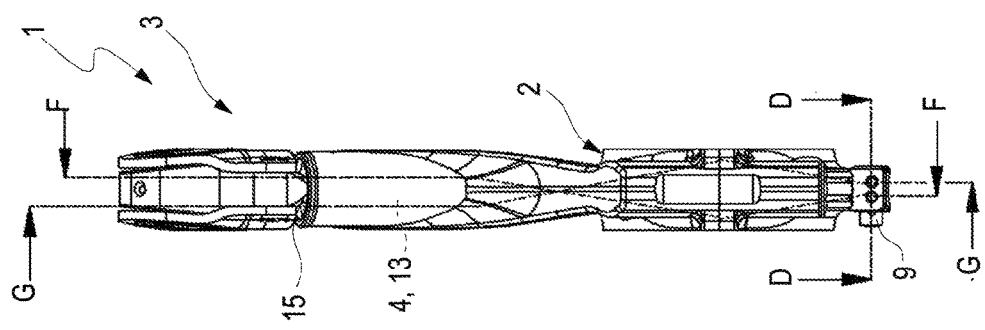
FIG. 23 illustrates the connecting rod according to the invention in a position for low compression in a side view with illustrated sectional planes D-D, F-F and G-G.
Figure 24:
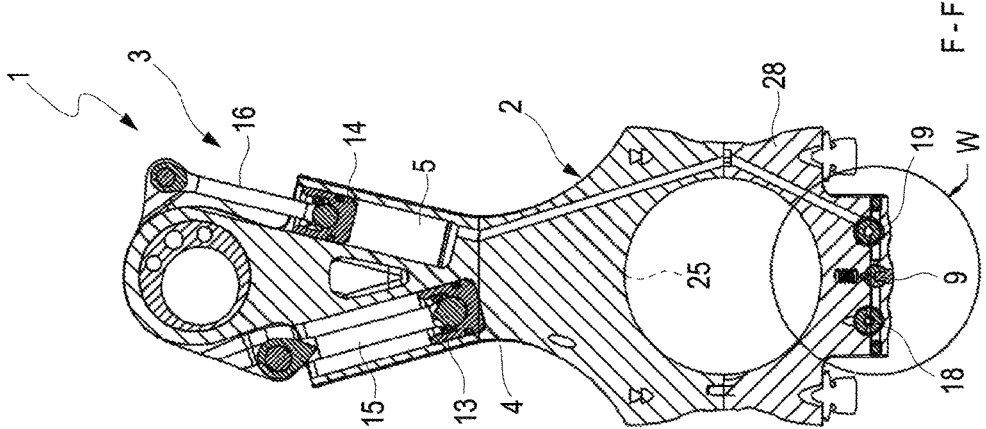
FIG. 24 illustrates the connecting rod in a longitudinal sectional view F-F in FIG. 23 with the illustrated blown up detail W.
Figure 28:
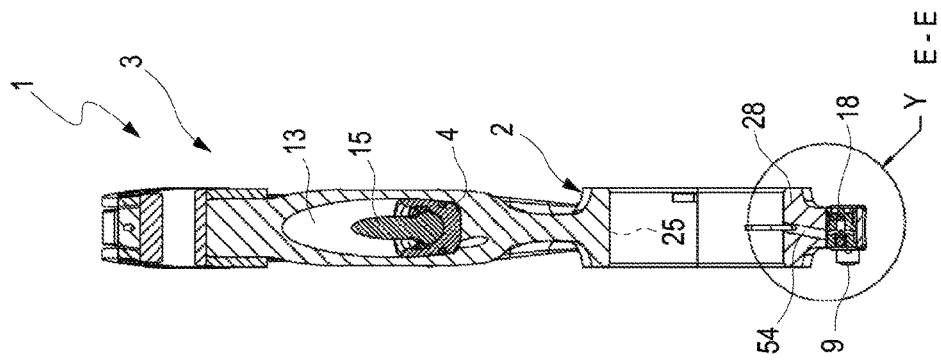
FIG. 28 illustrates the connecting rod in a longitudinal sectional view E-E in FIG. 26 with the illustrated enlarged detail Y.
Figure 26:
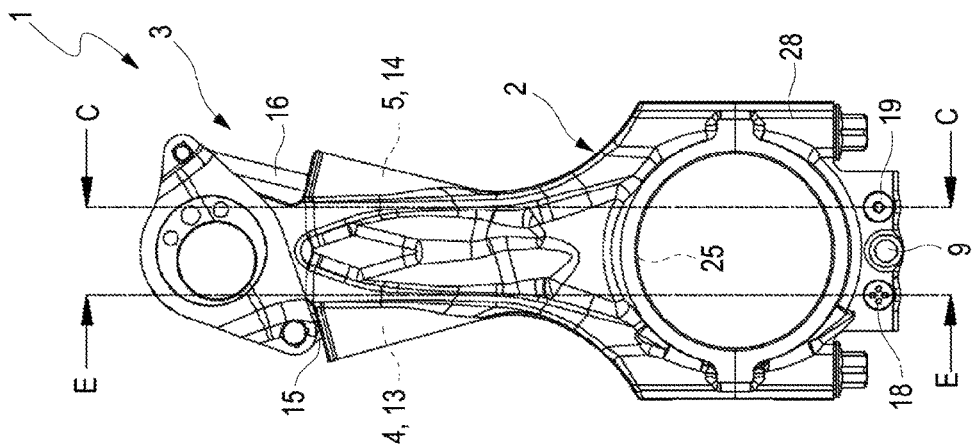
FIG. 26 illustrates the connecting rod according to the invention in a front view with illustrated sectional planes C-C and E-E.
Figure 27:
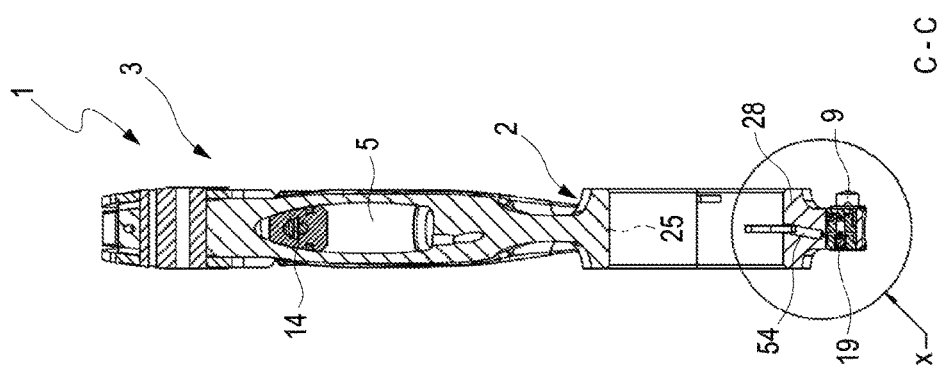
FIG. 27 illustrates the connecting rod in a longitudinal sectional view C-C in FIG. 26 with the illustrated blown up detail X.

FIG. 23 illustrates the connecting rod 1 according to the invention in a low compression position $\varepsilon_{low}$ in a side view with illustrated sectional planes D-D, F-F and G-G. The two longitudinal sectional views F-F and G-G are illustrated in FIG. 24 or 25. FIG. 26 illustrates the connecting rod 1 in a front view with illustrated sectional planes C-C and E-E which are illustrated in FIGS. 27 and 28. FIGS. 29 and 30 illustrate additional longitudinal sectional views A-A or B-B.

FIGS. 31 and 32 illustrate the corresponding longitudinal sectional views of the two check valves 18, 19 in the enlarged details X and Y of the connecting rod 1 in FIG. 13 or 14.

Figure 33:
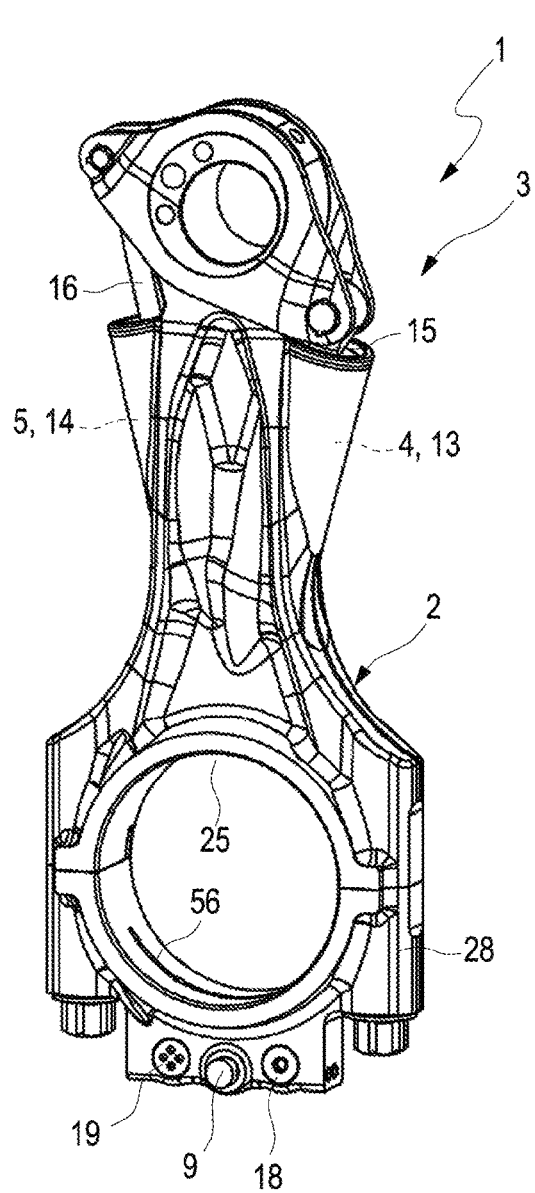
FIG. 33 illustrates the connecting rod in an isometric view.
Figure 34:
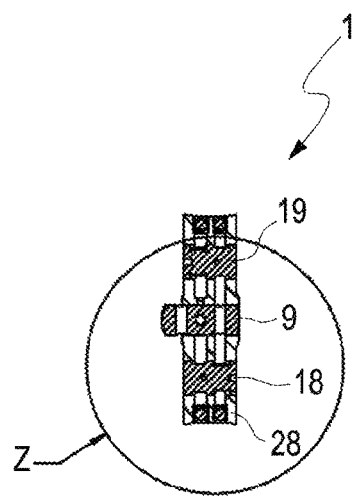
FIG. 34 illustrates the connecting rod in a cross section D-D in FIG. 23 with illustrated enlarged detail Z.
Figure 35:
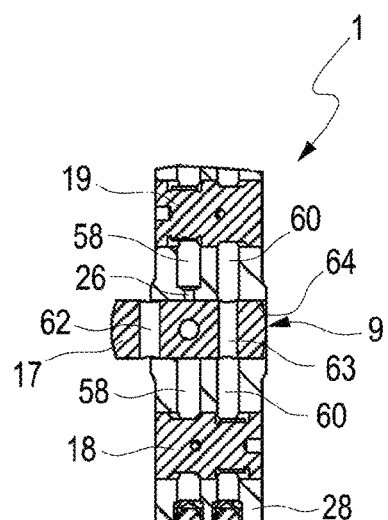
FIG. 35 illustrates the enlarged detail Z of the connecting rod in FIG. 34.

FIG. 33 illustrates the connecting rod 1 in an isometric view. FIG. 34 illustrates the connecting rod 1 in a cross section D-D in FIG. 23 with an illustrated blown up detail Z which is illustrated in FIG. 35. In this low compression position $\varepsilon_{low}$, the hydraulic conduit 60 is switched through by the bore hole 63 of the capture element 17, whereas the hydraulic conduit 58 is locked.

Figure 36:
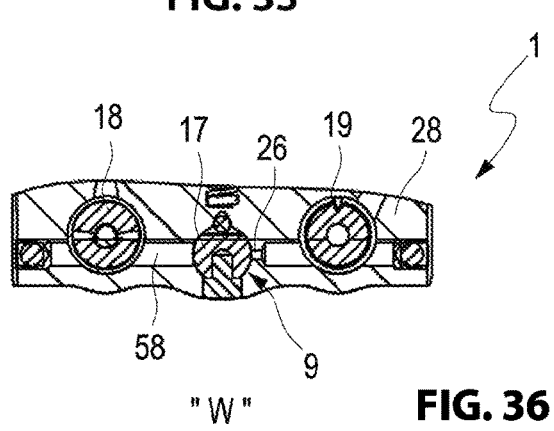
FIG. 36 illustrates the enlarged detail W of the connecting rod in FIG. 24.

Thus FIG. 36 illustrates a longitudinal sectional view in an enlarged detail W of the connecting rod 1 in FIG. 24 from which it is evident that the hydraulic conduit 58 is blocked by the capture element 17.

Figure 37:
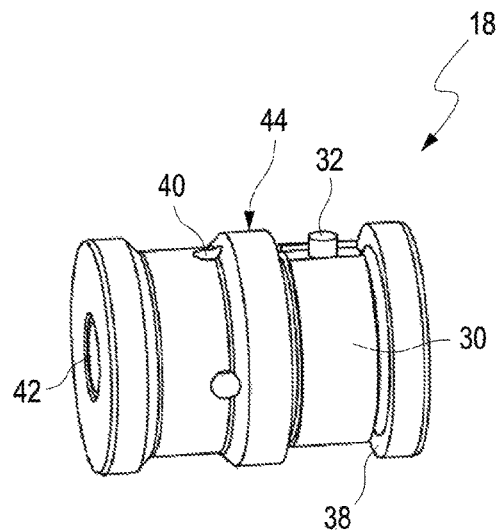
FIG. 37 illustrates the check valve according to the invention in an isometric view.
Figure 38:
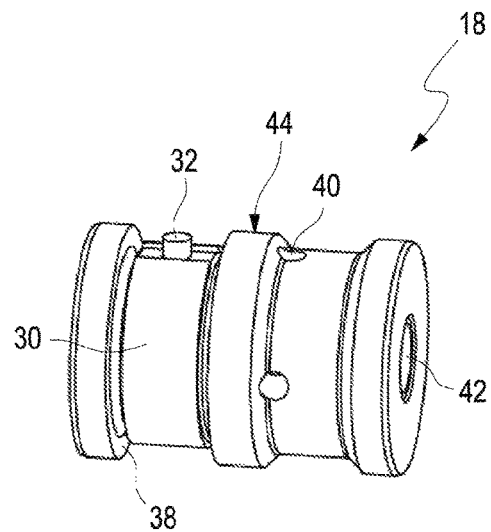
FIG. 38 illustrates the check valve in FIG. 37 in an isometric view rotated about the longitudinal axis by 90°.
Figure 39:
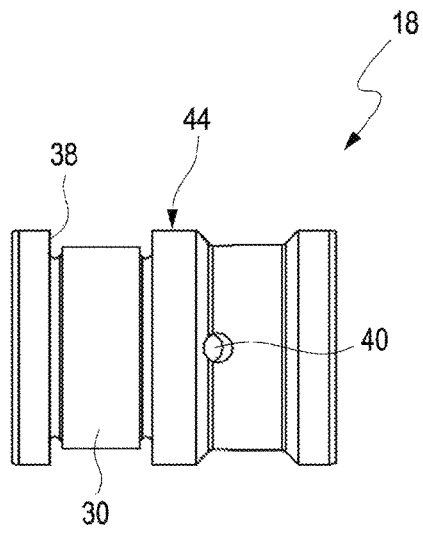
FIG. 39 illustrates the check valve of FIG. 37 in a side view.
Figure 40:
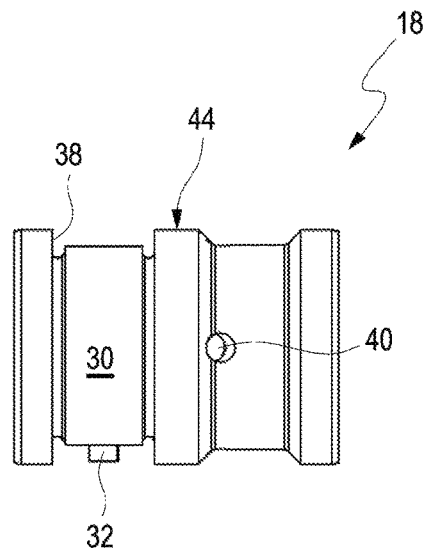
FIG. 40 illustrates the check valve in a side view that is rated about the longitudinal axis by 90°

FIGS. 37-44 show a check valve 18 in various views and sectional views. FIG. 37 illustrates the check valve 18 in an isometric view, whereas FIG. 38 illustrates the check valve 18 in an isometric view that is rotated by 90° about a longitudinal axis L, in FIG. 39 in a side view and in FIG. 40 in a side view that is rotated by 90° about the longitudinal axis L.

Figure 41:
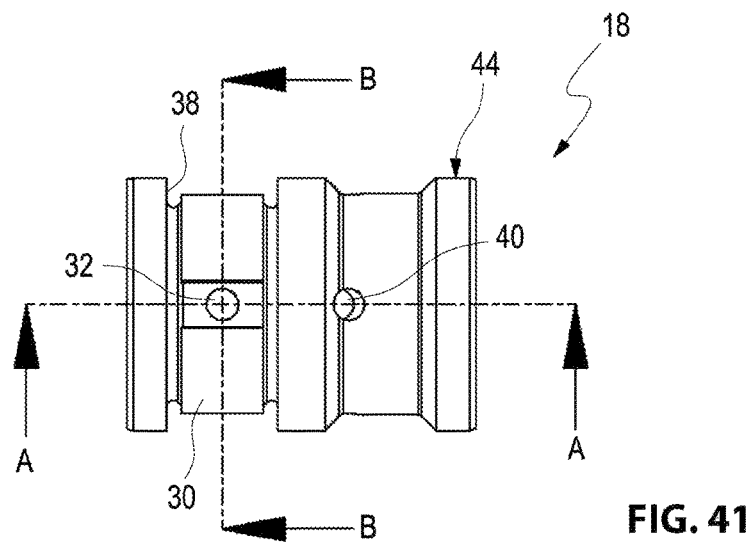
FIG. 41 illustrates the check valve in a side view that is rotated by 180° about the longitudinal axis with illustrated sectional planes A-A and B-B.
Figure 42:
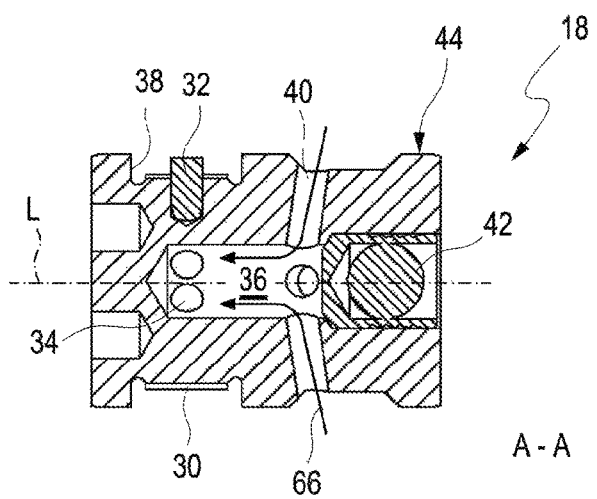
FIG. 42 illustrates the check valve in the longitudinal section view of A-A in FIG. 41.
Figure 43:
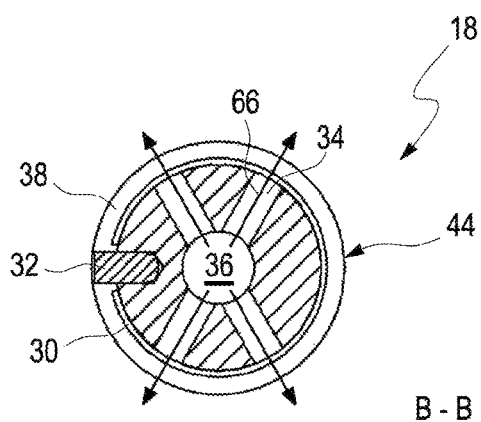
FIG. 43 illustrates the check valve in the cross section B-B in FIG. 41.
Figure 44:
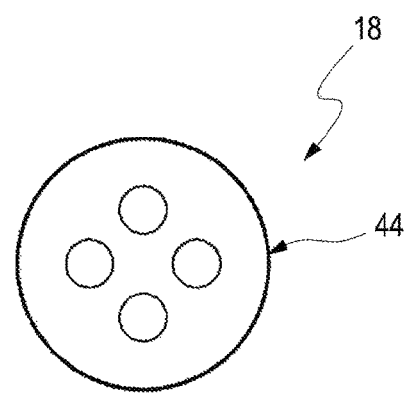
FIG. 44 illustrates the check valve in a top view.

FIG. 41 illustrates the check valve 18 in a side view that is rotated by 180° about the longitudinal axis L with illustrated sectional planes A-A and B-B whose longitudinal sectional view A-A is illustrated in FIG. 42 and the longitudinal sectional view B-B is illustrated in FIG. 43. FIG. 44 illustrates a top view of the check valve 18.

The check valve 18 includes a valve body 44 with a fluid path 66 which is indicated by arrows in the longitudinal sectional view A-A according to FIGS. 42, 43. Hydraulic fluid enters through radial bore holes 40 into a central bore hole 36 in an interior or the valve body 44 and can leave the valve body 44 again through additional radial bore holes 34. The bore holes 34 can be opened and closed by the closure element 30. It is evident that the closure element 30 is provided as an annular band which closes one or plural bore holes 34 in the valve body 44 and which envelops a circumference of the valve body 44 at least partially.

The annular band can be implemented for example as an elastic sheet metal band. The annular band opens in a radially outward direction at a pressure that is predetermined by the annular band and facilitates a hydraulic fluid flow into the non-illustrated hydraulic conduit of the connecting rod 1. The central bore hole 36 is closed by a closure plug 42.

Ends of the annular band do not overlap in the embodiment. Thus, a bolt 32 is provided for securing the annular band in position, wherein the bolt is arranged between the two ends of the annular joint of the annular band so that a twisting of the annular band can be reliably prevented. An axial position securing of the annular band is performed by a circumferential shoulder of a groove 38 of the valve body 44 in which the annular band is arranged.

The valve housing 44 can be pressed for example into the connecting rod body 2 and/or the connecting rod cover 28 of the connecting rod 1. Alternatively also a threading with the connecting rod body and/or the connecting rod cover 28 can be provided.

What it claimed is:

1. A hydraulic arrangement, comprising:
    a switch valve configured to control a hydraulic fluid flow of a connecting rod of an internal combustion engine with variable compression including an eccentrical element adjustment device for adjusting an effective connecting rod length,
    wherein the eccentrical element adjustment device includes at least a first cylinder and a second cylinder forming hydraulic chambers,
    wherein a first inlet is provided for feeding hydraulic fluid into the first cylinder through a supply conduit,
    wherein a second inlet is provided for feeding hydraulic fluid into the second cylinder through the supply conduit,
    wherein a first outlet is provided for draining hydraulic fluid from the first cylinder,
    wherein a second outlet is provided for draining hydraulic fluid from the second cylinder,
    wherein the switch valve includes a displaceable piston which is displaceable into a first switching position or a second switching position,
    wherein the first outlet of the first cylinder is connected with the supply conduit in the first switching position and the second outlet of the second cylinder is connected with the supply conduit in the second switching position,
    wherein a first check valve is associated with the first cylinder and a second check valve is associated with the second cylinder,
    wherein the first check valve facilitates feeding hydraulic fluid into the first cylinder and prevents draining hydraulic fluid from the first cylinder,
    wherein the second check valve facilitates feeding hydraulic fluid into the second cylinder and prevents draining hydraulic fluid from the second cylinder,
    wherein the first cylinder and the second cylinder are connected so that hydraulic fluid is transferable from the first cylinder into the second cylinder in the first switching position.

2. The hydraulic arrangement according to claim 1, wherein hydraulic fluid is transferable from the second cylinder into the first cylinder in the second switching position.

3. The hydraulic arrangement according to claim 1, wherein the second outlet of the second cylinder includes at least one first throttling location.

4. The hydraulic arrangement according to claim 1,
    wherein only the first check valve and no other check valve is associated with the first cylinder, and
    wherein only the second check valve and no other check valve is associated with the second cylinder.

5. The hydraulic arrangement according to claim 3, wherein a second throttling location is arranged between the supply connection and the second inlet of the second cylinder.

6. The hydraulic arrangement according to claim 5, wherein the second throttling location is arranged between a branch off point of the first outlet of the first cylinder and a hydraulic supply.

7. The hydraulic arrangement according to claim 1, wherein a hydraulic connection for filling the second cylinder from the first cylinder is configured un-throttled.

8. The hydraulic arrangement according to claim 6, wherein the switch valve, the at least one first throttling location and the second throttling location or at least one of the first check valve and the second check valve is integrated in a discrete hydraulic module.

9. The hydraulic arrangement according to claim 5, wherein at least one of the at least one first throttling location and the second throttling location is integrated into the switch valve.

10. The hydraulic arrangement according to claim 5, wherein at least one of the first check valve and the second check valve or at least one of the at least one first throttling location and the second throttling location is integrated into the switch valve.

11. The hydraulic arrangement according to claim 1,
    wherein the first inlet and the first outlet lead into the first cylinder in a common conduit, and
    wherein the second inlet and the second outlet lead into the second cylinder in a common conduit.

12. The hydraulic arrangement according to claim 1, wherein the displaceable piston is configured as a capture element.

13. A switch valve configured for the hydraulic arrangement according to claim 1, the switch valve comprising:
    at least one valve body; and
    the displaceable piston which is displaceable into a first switching position or a second switching position,
    wherein at least a first operating connection is connected with a first supply connection in the first switching position and at least a second operating connection is connected with a second supply connection in the second switching position.

14. The switch valve according to claim 13, wherein a hydraulic fluid conduit between the first operating connection and the first supply connection and a hydraulic fluid conduit between the second operating connection and the second supply connection includes at least one throttling location.

15. The switch valve according to claim 13, wherein a hydraulic fluid conduit between the first operating connection and the first supply connection and a hydraulic fluid conduit between the second operating connection and the second supply connection includes at least one check valve or at least one throttling location.

16. A connecting rod for an internal combustion engine with variable compression, the connecting rod comprising:
the eccentrical element adjustment device for adjusting the effective connecting rod length including the hydraulic arrangement according to claim 1,
wherein the eccentrical element adjustment arrangement includes at least the first cylinder and the second cylinder,
wherein a first inlet is provided for feeding hydraulic fluid into the first cylinder through a supply conduit,
wherein a second inlet is provided for feeding hydraulic fluid into the second cylinder through the supply conduit,
wherein a first outlet is provided for draining hydraulic fluid from the first cylinder, and
wherein a second outlet is provided for draining hydraulic fluid from the second cylinder.

17. The connecting rod according to claim 16, comprising:
at least one switch valve,
wherein the at least one switch valve includes a displaceable piston configured as a capture element which is displaceable into a first switching position or a second switching position,
wherein the outlet of the first cylinder is connected with the supply conduit in the first switching position and the outlet of the second cylinder is connected with the supply conduit in the second switching position,
wherein a first check valve is associated with the first cylinder and a second check valve is associated with the second cylinder,
wherein the first check valve facilitates feeding hydraulic fluid into the first cylinder and prevents draining hydraulic fluid from the first cylinder,
wherein the second check valve facilitates feeding hydraulic fluid into the second cylinder and prevents draining hydraulic fluid from the second cylinder, and
wherein the first cylinder and the second cylinder are connected so that hydraulic fluid is transferable from the first cylinder into the second cylinder in the first switching position.

18. The connecting rod according to claim 17, wherein at least one of the first check valve and the second check valve includes at least one closure element which is configured as an elastic annular band and which envelops a circumference of a valve body at least partially.

* * * * *